United States Patent
Tamse et al.

(10) Patent No.: US 10,819,978 B2
(45) Date of Patent: Oct. 27, 2020

(54) IMAGE ENCODING METHOD AND APPARATUS, AND IMAGE DECODING METHOD AND APPARATUS

(71) Applicant: SAMSUNG ELECTRONICS CO., LTD., Suwon-si (KR)

(72) Inventors: Anish Tamse, Seoul (KR); Jin-young Lee, Suwon-si (KR); Ki-ho Choi, Seoul (KR); Yin-ji Piao, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 16/069,421

(22) PCT Filed: Jan. 11, 2017

(86) PCT No.: PCT/KR2017/000358
§ 371 (c)(1),
(2) Date: Jul. 11, 2018

(87) PCT Pub. No.: WO2017/122997
PCT Pub. Date: Jul. 20, 2017

(65) Prior Publication Data
US 2019/0028703 A1    Jan. 24, 2019

Related U.S. Application Data

(60) Provisional application No. 62/277,052, filed on Jan. 11, 2016.

(51) Int. Cl.
*H04N 19/117* (2014.01)
*H04N 19/70* (2014.01)
(Continued)

(52) U.S. Cl.
CPC ......... *H04N 19/117* (2014.11); *H04N 19/139* (2014.11); *H04N 19/176* (2014.11); *H04N 19/70* (2014.11); *H04N 19/82* (2014.11)

(58) Field of Classification Search
CPC .................................................. H04N 19/117
See application file for complete search history.

(56) References Cited

U.S. PATENT DOCUMENTS 7,412,002 B2 *   8/2008   Koshiba ................. H04N 19/80
                                                          375/240.16
8,045,813 B2 *  10/2011   Lee ......................... H04N 19/82
                                                          382/238
(Continued)

FOREIGN PATENT DOCUMENTS

KR      10-2008-0088046 A      10/2008
KR      10-2009-0095014 A       9/2009
(Continued)

OTHER PUBLICATIONS

International Search Report and Written Opinion (PCT/ISA/210 and PCT/ISA/237), dated Apr. 19, 2017 by International Searching Authority in International Application No. PCT/KR2017/000358.
(Continued)

*Primary Examiner* — Irfan Habib
(74) *Attorney, Agent, or Firm* — Sughrue Mion, PLLC

(57) ABSTRACT

Provided are an image decoding method and apparatus and an image encoding method and apparatus, which filter a prediction block obtained via inter prediction.

11 Claims, 23 Drawing Sheets

(51) Int. Cl.
*H04N 19/82* (2014.01)
*H04N 19/176* (2014.01)
*H04N 19/139* (2014.01)

(56) References Cited

U.S. PATENT DOCUMENTS

| | | | | |
|---|---|---|---|---|
| 8,503,528 B2* | 8/2013 | Grange | ................. | H04N 19/61 |
| | | | | 375/240.13 |
| 8,649,431 B2* | 2/2014 | Cheon | ................. | H04N 19/176 |
| | | | | 375/240.03 |
| 9,131,073 B1* | 9/2015 | Bankoski | ................. | H04N 7/00 |
| 9,154,806 B2* | 10/2015 | Kim | ................. | H04N 19/523 |
| 9,344,729 B1* | 5/2016 | Grange | ................. | H04N 19/103 |
| 9,351,012 B2* | 5/2016 | Oh | ................. | H04N 19/615 |
| 9,547,886 B2* | 1/2017 | Alshina | ................. | H04N 19/182 |
| 9,893,824 B2* | 2/2018 | Kim | ................. | H04L 12/189 |
| 2006/0171569 A1 | 8/2006 | Budagavi | | |
| 2008/0240592 A1* | 10/2008 | Lee | ................. | H04N 19/82 |
| | | | | 382/238 |
| 2013/0051454 A1* | 2/2013 | Sze | ................. | H04N 19/70 |
| | | | | 375/240.02 |
| 2013/0077696 A1* | 3/2013 | Zhou | ................. | H04N 19/172 |
| | | | | 375/240.24 |
| 2014/0044161 A1* | 2/2014 | Chen | ................. | H04N 19/117 |
| | | | | 375/240.02 |
| 2014/0161186 A1* | 6/2014 | Zhang | ................. | H04N 19/52 |
| | | | | 375/240.16 |
| 2015/0085921 A1* | 3/2015 | Chou | ................. | H04N 19/176 |
| | | | | 375/240.03 |
| 2015/0229953 A1* | 8/2015 | Oh | ................. | H04N 19/126 |
| | | | | 375/240.17 |
| 2019/0098299 A1* | 3/2019 | Park | ................. | H04N 19/157 |
| 2019/0230353 A1* | 7/2019 | Gadde | ................. | H04N 19/14 |
| 2020/0084441 A1* | 3/2020 | Lee | ................. | H04N 19/105 |

FOREIGN PATENT DOCUMENTS

| | | |
|---|---|---|
| KR | 10-2011-0020212 A | 3/2011 |
| KR | 10-2011-0112188 A | 10/2011 |
| KR | 10-2014-0082702 A | 7/2014 |
| WO | 2013/073476 A1 | 5/2013 |

OTHER PUBLICATIONS

Liu et al., Fast Motion Blur Compensation in HEVC Using Fixed-Length Filter, 2015 IEEE International Conference on Image Processing (ICIP), Sep. 27, 2015, pp. 2567-2571, (5 pages total).

Communication dated Sep. 18, 2018, issued by the European Patent Office in counterpart European Application No. 17738626.5.

Communication dated Feb. 18, 2019, from the European Patent Office in counterpart European Application No. 17738626.5.

"Gaussian blur" Wikipedia, retrieved from the internet on Feb. 5, 2019 [https://en.wikipedia.org/wiki/Gaussian_blur] 5 pages total.

* cited by examiner

FIG. 11
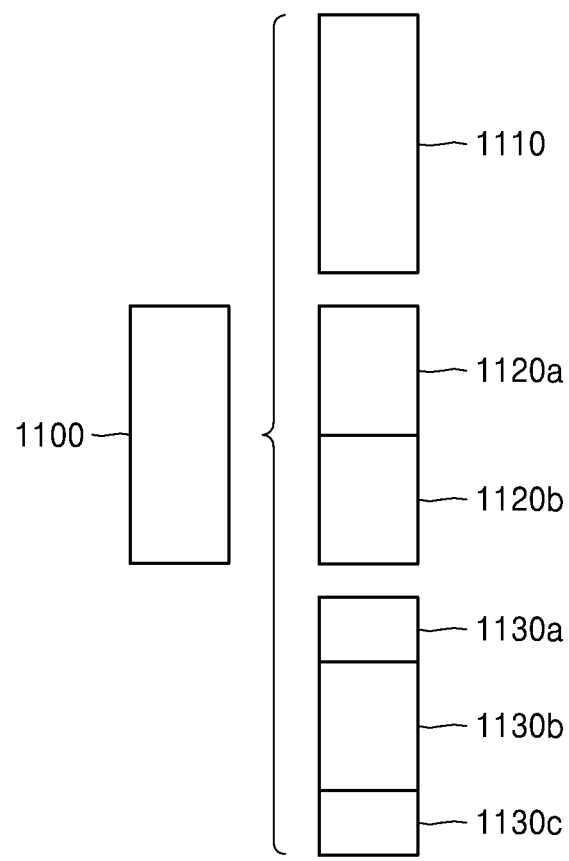
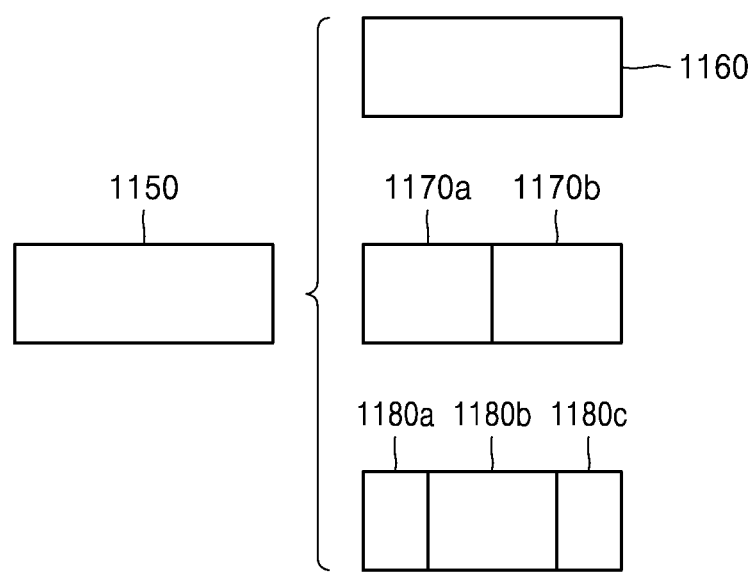

FIG. 20

| BLOCK TYPE / DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

IMAGE ENCODING METHOD AND APPARATUS, AND IMAGE DECODING METHOD AND APPARATUS

TECHNICAL FIELD

The present disclosure relates to image encoding/decoding apparatuses and methods including inter prediction.

BACKGROUND ART

Image data is encoded according to a codec based on a predetermined data compression standard, for example, the Moving Picture Experts Group (MPEG) standard, and then stored in a recording medium or transmitted through a communication channel in the form of a bitstream.

With the development and supply of hardware for reproducing and storing high-resolution or high-quality image content, there is a growing need for a codec for effectively encoding or decoding the high-resolution or high-quality image content. Encoded image content may be reproduced by being decoded. Recently, methods of effectively compressing such high-resolution or high-quality image content have been implemented. For example, an inter prediction method of compressing an image by using a temporal correlation of images has been implemented.

DESCRIPTION OF EMBODIMENTS

Technical Problem

An image encoding process includes a process of transmitting, in a bitstream, a residual signal corresponding to a difference between an original signal and a predicted signal. Thus, for efficient prediction, minimization of the residual signal is required.

Solution to Problem

Provided is an image decoding method including partitioning an image into one or more blocks; obtaining a motion vector of a current block partitioned from the image; obtaining a prediction block of the current block by performing inter prediction on the current block, based on the motion vector; determining information of a filter, based on at least one of a size and a direction of the motion vector; filtering the prediction block by using the information of the filter; obtaining a residual block of the current block from a bitstream; and reconstructing the current block by using the filtered prediction block and the residual block.

Provided is an image decoding apparatus including a bitstream obtainer configured to obtain a residual block of a current block from a bitstream; and a decoder configured to: partition an image into one or more blocks; obtain a motion vector of the current block partitioned from the image; obtain a prediction block of the current block by performing inter prediction on the current block, based on the motion vector; determine information of a filter, based on at least one of a size and a direction of the motion vector; filter the prediction block by using the information of the filter; and reconstruct the current block by using the filtered prediction block and the residual block.

Provided is an image encoding method including partitioning an image into one or more blocks; obtaining a motion vector of a current block partitioned from the image; obtaining a prediction block of the current block by performing inter prediction on the current block, based on the motion vector; determining information of a filter, based on at least one of a size and a direction of the motion vector; filtering the prediction block by using the information of the filter; encoding a residual block between the filtered prediction block and original data of the current block; and generating a bitstream including the encoded residual block.

Provided is an image encoding apparatus including an encoder configured to: partition an image into one or more blocks; obtain a motion vector of a current block partitioned from the image; obtain a prediction block of the current block by performing inter prediction on the current block, based on the motion vector; determine information of a filter, based on at least one of a size and a direction of the motion vector; filter the prediction block by using the information of the filter; encode a residual block between the filtered prediction block and original data of the current block; and a bitstream generator configured to generate a bitstream including the encoded residual block.

Advantageous Effects of Disclosure

Blurring characteristics may be reflected in a motion vector, and thus, when a prediction block is filtered based on the motion vector, a residual block may be minimized such that encoding and decoding performance may be improved.

BRIEF DESCRIPTION OF DRAWINGS

FIG. 11 illustrates an operation of determining one or more coding units by partitioning a non-square coding unit, according to an embodiment.

FIG. 20 illustrates an operation of determining a depth of a coding unit as the shape and size of the coding unit varies when a plurality of coding units are determined by recursively partitioning the coding unit, according to an embodiment.

BEST MODE

Figure 1:
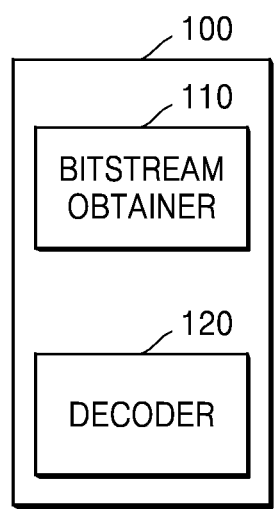
FIG. 1 is a block diagram of an image decoding apparatus, according to an embodiment.

According to an aspect of the disclosure, an image decoding method includes partitioning an image into one or more blocks; obtaining a motion vector of a current block partitioned from the image; obtaining a prediction block of the current block by performing inter prediction on the current block, based on the motion vector; determining information of a filter, based on at least one of a size and a direction of the motion vector; filtering the prediction block by using the information of the filter; obtaining a residual block of the current block from a bitstream; and reconstructing the current block by using the filtered prediction block and the residual block.

The determining of the information of the filter may include determining a size of the filter, based on the size of the motion vector.

The determining of the information of the filter may include determining a current sample in the prediction block; and determining a neighboring sample of the current sample, based on the direction of the motion vector. Also, the filtering may include obtaining a filtered prediction value of the current sample by using a prediction value of the neighboring sample.

The determining of the information of the filter may further include determining a first weight of the current sample and a second weight of the neighboring sample, based on the size and the direction of the motion vector, and the filtered prediction value may be obtained by using a prediction value of the current sample to which the first weight has been applied and the prediction value of the neighboring sample to which the second weight has been applied.

The image decoding method may further include determining a type of the filter, based on an inter prediction mode of the current block.

The image decoding method may further include determining a type of the filter, based on a reference direction indicating at least one reference picture list used in the inter prediction.

The image decoding method may further include, when an inter prediction mode of the current block is an Advanced Motion Vector Prediction (AMVP) mode and a reference direction indicating at least one reference picture list used in the inter prediction is unidirectional, determining a type of the filter as a first filter type or a second filter type; and when the inter prediction mode of the current block is the AMVP mode and the reference direction is bidirectional, determining the type of the filter as the first filter type.

The image decoding method may further include, when an inter prediction mode of the current block is a merge mode, determining a type of the filter as a first filter type, without consideration of a reference direction indicating at least one reference picture list used in the inter prediction.

The image decoding method may further include obtaining a first flag of the current block from a bitstream, the first flag indicating whether to perform filtering on the prediction block; and when the first flag indicates to perform filtering on the prediction block, obtaining a second flag of the current block from the bitstream, the second flag indicating a type of the filter.

A context index used in performing arithmetic decoding on the first flag and the second flag may be determined based on at least one of the size of the motion vector and a size of the current block.

The image decoding method may further include obtaining, from the bitstream, a merge candidate index indicating a merge candidate in a merge candidate list when an inter prediction mode of the current block is a merge mode, the merge candidate being used to perform the inter prediction on the current block. Also, in the image decoding method, whether to perform filtering on the prediction block according to a motion vector of the merge candidate may be determined based on a value of the merge candidate index.

When an inter prediction mode of the current block is a merge mode, the filter that has been applied to the prediction block may be determined as a filter for a merge candidate.

According to another aspect of the disclosure, an image decoding apparatus includes a bitstream obtainer configured to obtain a residual block of a current block from a bitstream; and a decoder configured to: partition an image into one or more blocks; obtain a motion vector of the current block partitioned from the image; obtain a prediction block of the current block by performing inter prediction on the current block, based on the motion vector; determine information of a filter, based on at least one of a size and a direction of the motion vector; filter the prediction block by using the information of the filter; and reconstruct the current block by using the filtered prediction block and the residual block.

According to another aspect of the disclosure, an image encoding method includes partitioning an image into one or more blocks; obtaining a motion vector of a current block partitioned from the image; obtaining a prediction block of the current block by performing inter prediction on the current block, based on the motion vector; determining information of a filter, based on at least one of a size and a direction of the motion vector; filtering the prediction block by using the information of the filter; encoding a residual block between the filtered prediction block and original data of the current block; and generating a bitstream including the encoded residual block.

According to another aspect of the disclosure, an image encoding apparatus includes an encoder configured to: partition an image into one or more blocks; obtain a motion vector of a current block partitioned from the image; obtain a prediction block of the current block by performing inter prediction on the current block, based on the motion vector; determine information of a filter, based on at least one of a size and a direction of the motion vector; filter the prediction block by using the information of the filter; encode a residual block between the filtered prediction block and original data of the current block; and a bitstream generator configured to generate a bitstream including the encoded residual block.

Mode of Disclosure

Advantages and features of the present disclosure and methods of achieving them will be apparent from embodiments set forth herein in conjunction with the accompanying drawings. However, the present disclosure is not limited to the embodiments and may be embodied in many different forms. The embodiments are merely provided so that this disclosure will be thorough and complete and will fully convey the scope of the present disclosure to those of ordinary skill in the art.

The terms used herein will be briefly described and then the present disclosure will be described in detail.

In the present disclosure, general terms that have been widely used nowadays are selected, if possible, in consideration of functions of the present disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the present specification.

As used herein, the singular forms "a", "an" and "the" are intended to include the plural forms as well, unless the context clearly indicates otherwise.

It will be understood that when an element is referred to as including another element, the element can further include other elements unless mentioned otherwise. The term "unit" used herein should be understood as software or a hardware component, such as a field-programmable gate array (FPGA) or an application-specific integrated circuit (ASIC), which performs certain functions. However, the term "unit" is not limited to software or hardware. The term "unit" may be configured to be included in an addressable storage medium or be configured to reproduce one or more processors. Thus, for example, the term "unit" may include components, such as software components, object-oriented software components, class components and task components, processes, functions, attributes, procedures, subroutines, segments of program code, drivers, firmware, microcode, a circuit, data, database, data structures, tables, arrays, and variables. Functions provided in components and "units" may be combined to obtain a small number of components and "units" or may be split into sub-components and "sub-units".

Hereinafter, the term "image" should be understood to include a static image, such as a still image of a video, and a moving picture, i.e., a dynamic image which is a video.

The term "sample" should be understood as data allocated to an image sampling position, i.e., data to be processed. For example, pixel values of an image in a spatial domain and transform coefficients in a transform domain may be samples. A unit including such at least one sample may be defined as a block.

Embodiments of the present disclosure will be described in detail below such that those of ordinary skill in the art can easily implement them. In the drawings, for a more clear description of the present disclosure, parts that are not related to the descriptions are omitted.

In the case where a fast moving object is present in an image, a blur may occur around the moving object when the image is encoded and decoded. Intensity of blur may vary according to frames. For example, when an object does not move with a constant speed, intensity of blur between frames may not be constant according to a changing speed of the object. In the case where intensity of blur varies between frames, when a prediction block of a current frame is generated by using a previous frame that is not compensated for, encoding and decoding performances may not be efficient. The present specification discloses methods and apparatuses for improving encoding and decoding performances by filtering a prediction block obtained through inter prediction.

FIG. 1 is a block diagram of an image decoding apparatus, according to an embodiment.

An image decoding apparatus 100 may include a bitstream obtainer 110 and a decoder 120. The image decoding apparatus 100 may include a central processor configured to generally control the bitstream obtainer 110 and the decoder 120. Alternatively, the bitstream obtainer 110 and the decoder 120 may correspond to one processor or may correspond to a plurality of processors that interoperate with each other. Alternatively, the bitstream obtainer 110 and the decoder 120 may be controlled by an external processor of the image decoding apparatus 100.

The decoder 120 may partition an image into one or more blocks.

A "block" may denote a data unit of inter prediction which is determined to decode an encoded image. For example, the block may correspond to a prediction unit that is a data unit on which inter prediction or intra prediction such as High Efficiency Video Coding (HEVC) is to be performed. In more detail, according to HEVC, a coding unit is determined by partitioning an image according to a quad-tree shape, and a prediction unit is determined from the coding unit according to a partition type indicating a shape into which the coding unit is partitioned into prediction units.

However, the block determined by the image decoding apparatus 100 is not limited to the prediction unit based on HEVC. For example, the block may correspond to a coding unit determined based on block shape information. The coding unit determined based on the block shape information will be described in detail below with reference to FIGS. 10 through 23.

The decoder 120 may obtain a motion vector of a current block partitioned from an image. Also, the decoder 120 may obtain a prediction block of the current block by performing inter prediction on the current block, based on the motion vector.

The motion vector may be position information about a block in a reference picture to be used to predict the current block. The decoder 120 may obtain the motion vector of the current block by using a merge mode or an Advanced Motion Vector Prediction (AMVP) mode, and may generate an optimized prediction block of the current block from a previously-decoded reference image, based on the motion vector. The merge mode and the AMVP mode may be distinguished therebetween according to methods of obtaining motion information of a current block. In more detail, the merge mode may obtain not only a motion vector of a current block but also to obtain a reference direction and a reference picture index from a neighboring block that is spatially adjacent to the current block or a collocated block that temporally corresponds to the current block. The AMVP mode may obtain only the motion vector of the current block from the neighboring block that is spatially adjacent to the current block or the collocated block that temporally corresponds to the current block.

The decoder 120 may determine filter information, based on at least one of a size and a direction of the motion vector of the current block. Also, the decoder 120 may filter the prediction block of the current block by using the determined filter information. In this regard, the filter information may include a size of a filter, a neighboring sample of the current sample which is used by the filter, and a weight of the neighboring sample.

As described above, when a blur occurs due to a moving object in an image, a blurring characteristic including at least one of intensity of the blur and a direction of the blur may be reflected to a motion vector of the current block which corresponds to the object. Thus, when the prediction block of the current block is filtered based on the motion vector of the current block, residual data of the current block may be minimized such that encoding and decoding performances may be improved. The filter information determined based on the motion vector will be described in detail with reference to FIGS. 4 through 6.

The bitstream obtainer 110 may obtain a residual block of the current block from a bitstream. In more detail, the bitstream obtainer 110 may obtain, from the bitstream, syntax elements of the residual block which are compressed via an encoding process including transformation, quantization, and entropy encoding.

Also, the decoder 120 may reconstruct the current block by using the filtered prediction block and the residual block obtained by the bitstream obtainer 110.

A residual block according to the related art may correspond to a difference between original data of a current block and a prediction block generated according to inter prediction, whereas the residual block obtained by the bitstream obtainer 110 may correspond to a difference between original data of the current block and the prediction block filtered based on the motion vector.

Figure 2:
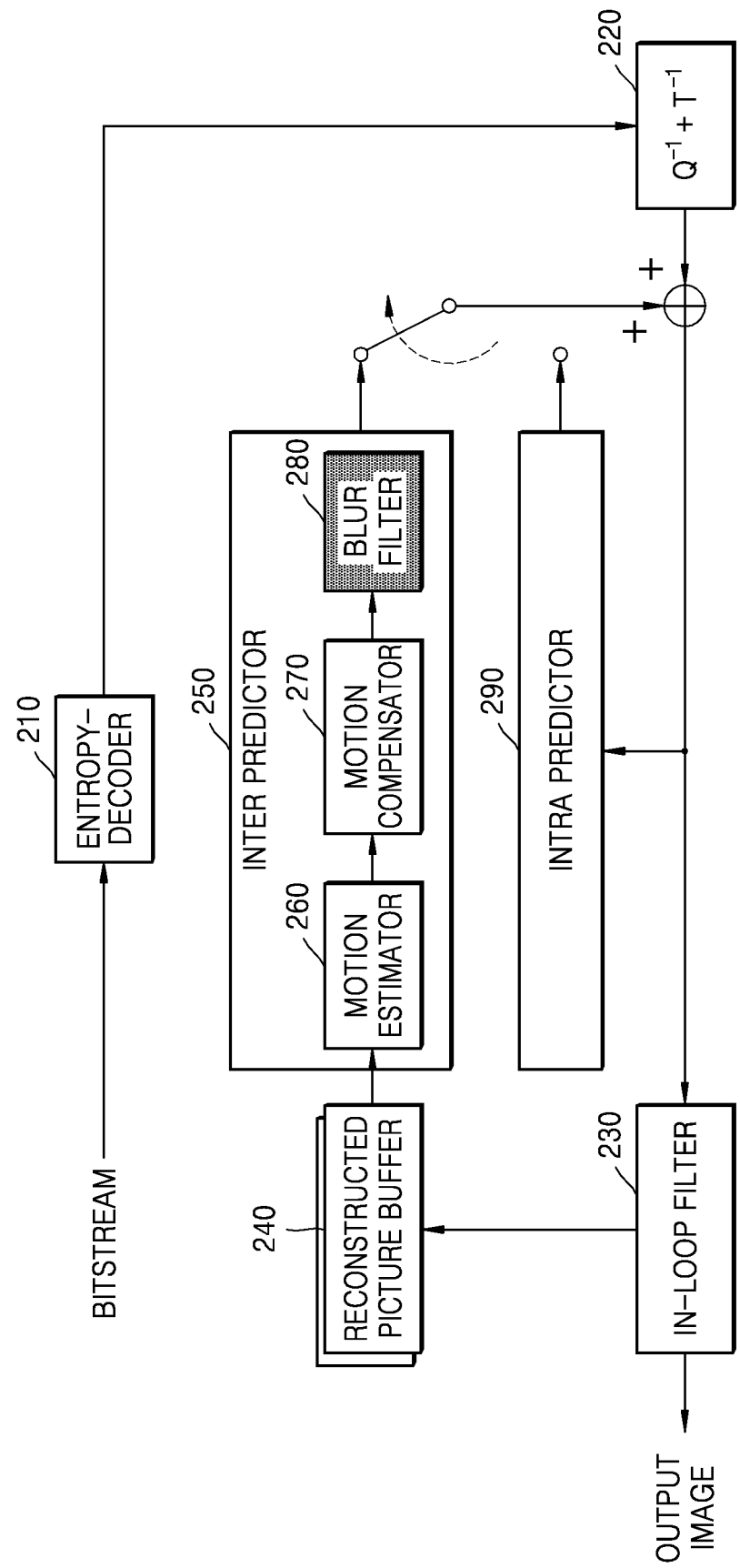
FIG. 2 is a block diagram of a decoder included in an image decoding apparatus, according to an embodiment.

FIG. 2 is a block diagram of a decoder included in an image decoding apparatus, according to an embodiment.

The decoder 120 may include an entropy-decoder 120, an inverse-quantizer and inverse-transformer 220, an in-loop filter 230, a reconstructed picture buffer 240, an inter predictor 250, and an intra predictor 290. For convenience of description, in FIG. 2, the decoder 120 is divided into a plurality of modules according to functions, but as described above, the decoder 120 may correspond to one processor.

The entropy-decoder 210 may entropy decode the syntax elements of the residual block obtained from the bitstream obtainer 110. Because the syntax elements correspond to data compressed via an entropy encoding process, the entropy-decoder 210 may perform entropy decoding on the syntax elements of the residual block. For example, the entropy-decoder 210 may obtain quantized transform coefficients of the residual block by scanning the syntax elements according to a set order and then performing arithmetic decoding and de-binarizing on the scanned syntax elements.

The inverse-quantizer and inverse-transformer 220 may inverse quantize and inverse transform the entropy-decoded residual block. Because a plurality of items of data of the entropy-decoded residual block correspond to transform coefficients compressed via quantization, the inverse-quantizer and inverse-transformer 220 may reconstruct data of the residual block by performing inverse quantization and inverse transformation on the quantized transform coefficients.

The in-loop filter 230 may filter data of a spatial domain which is reconstructed by adding data of the prediction block and the data of the residual block. For example, the in-loop filter 230 may output a reconstructed image by applying a de-blocking filter and a sample adaptive offset (SAO) filter to the reconstructed data of the spatial domain. Also, images output from the in-loop filter 230 may be stored in the reconstructed picture buffer 240.

The inter predictor 250 may generate a prediction block of a current block by using a reference picture stored in the reconstructed picture buffer 240, and may filter the prediction block, based on a motion vector of the current block. In more detail, the inter predictor 250 may include a motion estimator 260, a motion compensator 270, and a blur filter 280. The motion estimator 260 may estimate an optimal block for predicting the current block, the optimal block being from reference pictures, which are stored in the reconstructed picture buffer 240, of the current block. The motion compensator 270 may generate the prediction block of the current block by using motion information including the motion vector of the current block which is obtained in a motion estimation process.

The blur filter 280 may filter the prediction block, based on the motion vector of the current block. As described above, the motion vector may include a blurring characteristic of the current block, thus, when a blurring artifact occurred in the current block, filtering performed by the blur filter 280 may effectively improve encoding and decoding performances.

Unlike the inter predictor 250 configured to generate a prediction block, based on a temporal correlation, the intra predictor 290 may generate a prediction block by using a spatial correlation between images.

Figure 3:
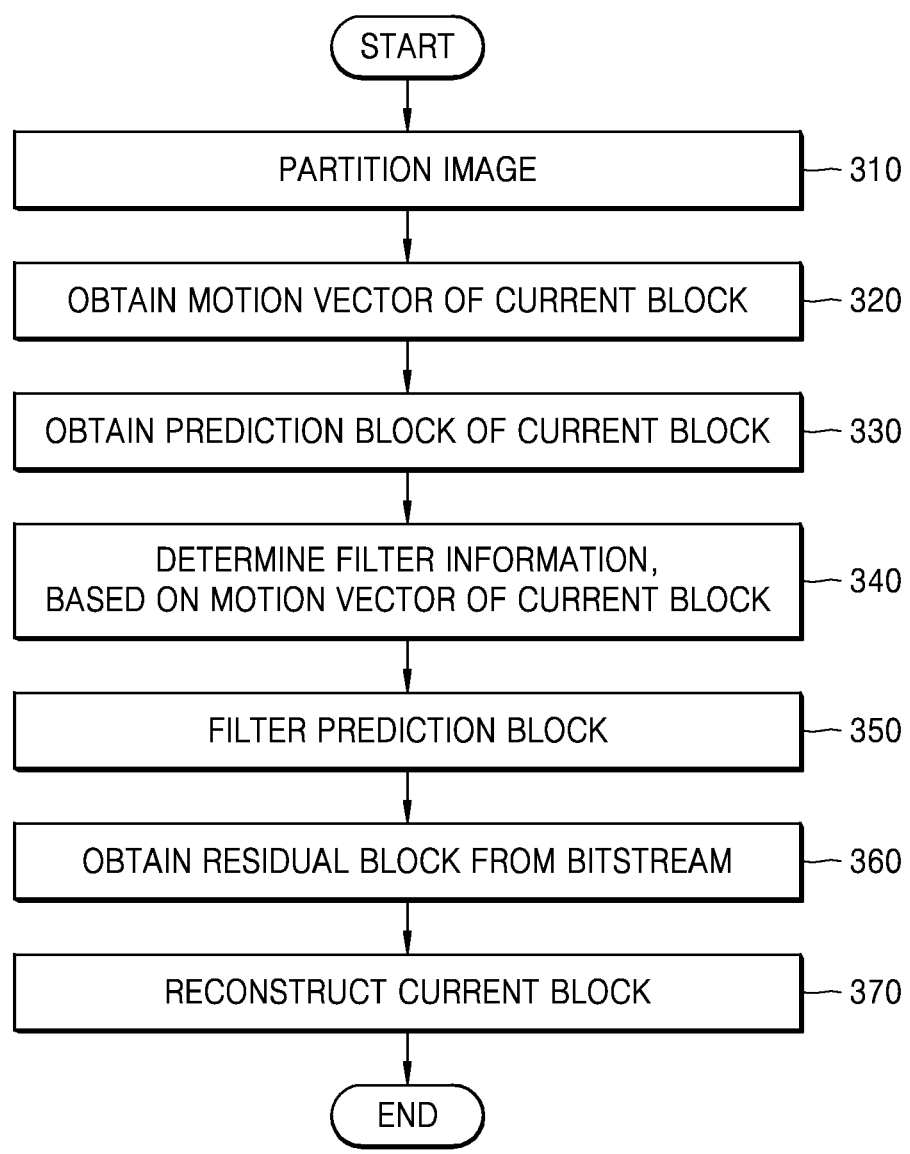
FIG. 3 is a flowchart of an image decoding method performed by an image decoding apparatus, according to an embodiment.

FIG. 3 is a flowchart of an image decoding method performed by an image decoding apparatus, according to an embodiment.

In operation 110, the image decoding apparatus 100 may partition an image into one or more blocks. In operation 120, the image decoding apparatus 100 may obtain a motion vector of a current block partitioned from the image. In operation 130, the image decoding apparatus 100 may obtain a prediction block of the current block by performing inter prediction on the current block, based on the motion vector. In operation 140, the image decoding apparatus 100 may determine filter information, based on at least one of a size and a direction of the motion vector of the current block. In operation 150, the image decoding apparatus 100 may filter the prediction block by using the filter information determined in operation 140. In operation 160, the image decoding apparatus 100 may obtain a residual block of the current block from a bitstream. In operation 170, the image decoding apparatus 100 may reconstruct the current block by using the prediction block filtered in operation 150 and the residual block obtained in operation 160.

Operations 110, 120, 130, 140, 150, and 170 may be performed by the decoder 120 of the image decoding apparatus 100. Also, operation 160 may be performed by the bitstream obtainer 110.

Figure 4:
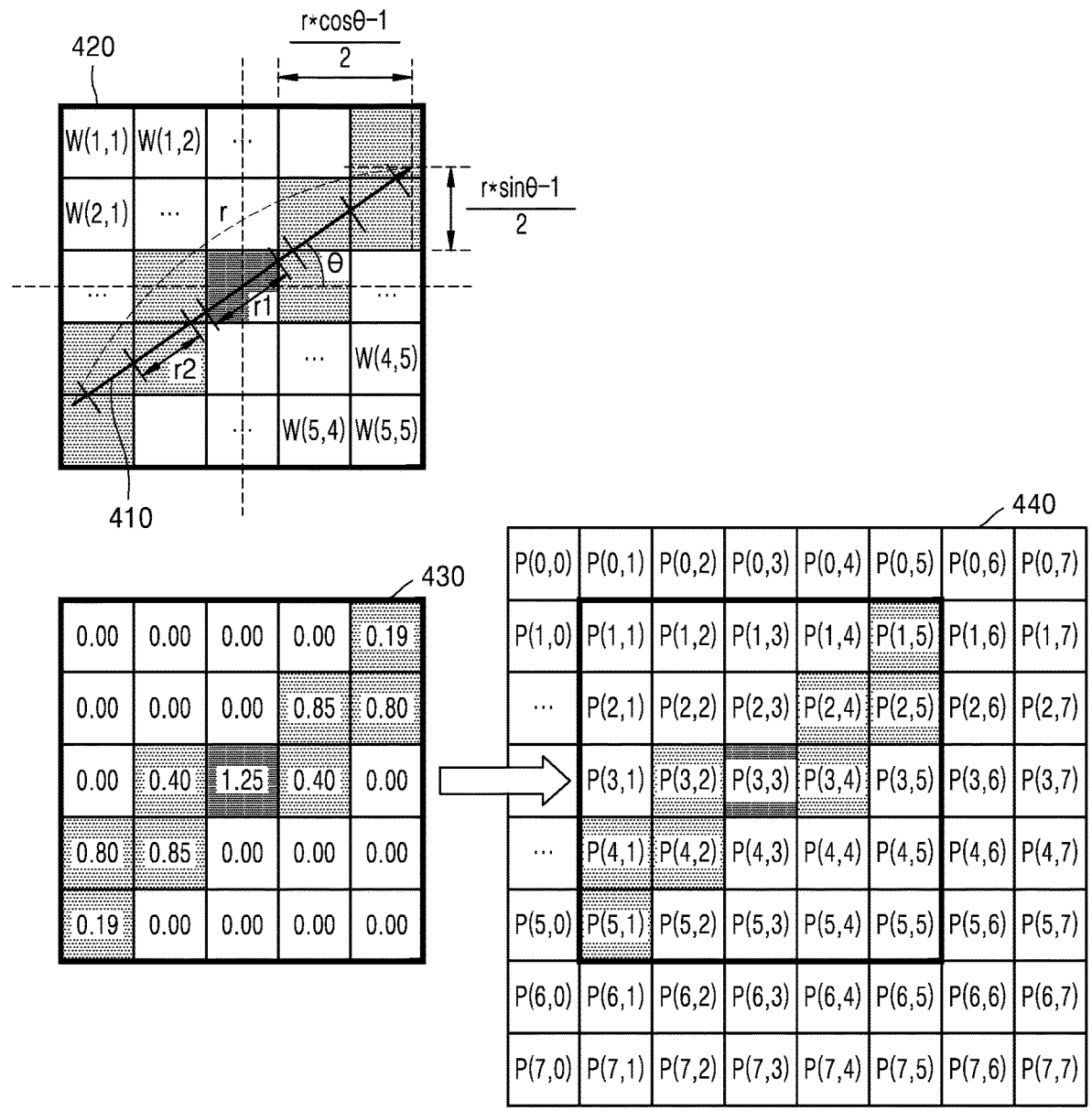
FIG. 4 illustrates an operation of filtering a prediction block, based on a motion vector, according to an embodiment.

FIG. 4 illustrates an operation of filtering a prediction block, based on a motion vector, according to an embodiment.

When a motion vector 410 of a current block is expressed as polar coordinates, it may be r∠θ, where r may indicate a size of the motion vector 410 of the current block, and θ may indicate a direction of the motion vector 410 of the current block.

The image decoding apparatus 100 may generate a filter 420 for filtering a prediction block, based on at least one of the size and the direction of the motion vector 410 of the current block.

The image decoding apparatus 100 may determine a size of the filter 420, based on the size of the motion vector 410 of the current block. In more detail, the image decoding apparatus 100 may generate a square filter by determining a width and a height of a filter to be an integer N obtained by rounding up, rounding off, or discarding the size r of the motion vector 410. For example, the image decoding apparatus 100 may determine the width and the height of the filter to be an integer obtained by rounding up the size r of the motion vector 410 of the current block, as in Equation 1.

Width and Height of Filter=roundup(r)      [Equation 1]

In addition, the image decoding apparatus 100 may determine the size of the filter 420, based on at least one of the size and the direction of the motion vector 410 of the current block. For example, the size of the filter 420 may be determined based on a horizontal component size or a vertical component size of the motion vector 410 of the current block. In more detail, the image decoding apparatus 100 may generate a N×N-square filter by determining the width and the height of the filter to be an integer N obtained by rounding up, rounding off, or discarding a maximum value from among r*cos θ that is a horizontal component size and r*sin θ that is a vertical component size of the motion vector 410 of the current block. For example, as in Equation 2, the image decoding apparatus 100 may determine the width and the height of the filter to be an integer obtained by rounding up the maximum value from among r*cos θ that is the horizontal component size and r*sin θ that is the vertical component size of the motion vector 410 of the current block.

Width and Height of Filter=roundup(Max(r*cos θ,r*sin θ)))      [Equation 2]

As another example, the image decoding apparatus 100 may generate a N×M square or rectangular filter by determining a width of the filter 420 to be an integer N obtained by rounding up, rounding off, or discarding r*cos θ that is a horizontal direction size of the motion vector 410, and determining a height of the filter 420 to be an integer M obtained by rounding up, rounding off, or discarding r*sin θ that is a vertical direction size of the motion vector 410. For example, as in Equation 3, the image decoding apparatus 100 may determine the width of the filter 420 to be an integer obtained by rounding up r*cos θ that is the horizontal direction size of the motion vector 410, and may determine the height of the filter 420 to be an integer obtained by rounding up r*sin θ that is the vertical direction size of the motion vector 410.

Width of Filter=roundup(r*cos θ)

Height of Filter=roundup(r*sin θ)      [Equation 3]

As another example, the image decoding apparatus 100 may further elaborately determine the size of the filter 420, based on the size and the direction of the motion vector 410 of the current block, as in Equation 4. The filter 420 having the size according to Equation 4 may correspond to a square filter or a rectangular filter, which is the smallest one whose height and width correspond to an integer pixel distance and which may include the motion vector 410.

$$\text{Width of Filter} = 2 * \text{roundup}\left(\frac{r*\cos\theta - 1}{2}\right) + 1$$

$$\text{Height of Filter} = 2 * \text{roundup}\left(\frac{r*\sin\theta - 1}{2}\right) + 1$$

[Equation 4]

For example, when the size r of the motion vector 410 of the current block corresponds to a pixel distance of 5.73, and a direction (or an angle) θ of the motion vector 410 of the current block corresponds to 37 degrees, the filter 420 generated according to Equation 4 may correspond to a 5×5-square filter. In addition, the filter 420 generated according to Equation 4 may correspond a smallest square filter of an integer pixel unit which may include the motion vector 410.

Also, the image decoding apparatus 100 may determine the size of the filter 420, based on at least one of the size and the direction of the motion vector 410 of the current block and additionally based on at least one of a quantization parameter, a prediction block size, and a slice type.

The quantization parameter denotes an element to control intensity of quantization in an encoding process. When the quantization parameter is small, elaborate quantization is performed on a transform coefficient such that a quantization error may be relatively decreased, but on the other hand, when the quantization parameter is large, the quantization error may be relatively increased. Thus, when the quantization parameter is small, the image decoding apparatus 100 may decrease the size of the filter 420 generated based on the motion vector 410, but on the other hand, when the quantization parameter is large, the image decoding apparatus 100 may increase the size of the filter 420 generated based on the motion vector 410. In more detail, when the quantization parameter is equal to or less than a predetermined minimum threshold value, the image decoding apparatus 100 may decrease by half the size of the filter 420 generated based on the motion vector 410. On the other hand, when the quantization parameter is equal to or greater than a predetermined maximum threshold value, the image decoding apparatus 100 may doubly increase the size of the filter 420 generated based on the motion vector 410.

In addition, a limit of the size of the filter 420 generated based on the motion vector 410 may correspond to the prediction block size. In more detail, when the size of the filter 420 generated based on the motion vector 410 is greater than the prediction block size, the image decoding apparatus 100 may decrease the size of the filter 420 to the prediction block size.

A slice type to which the current block belongs may be a predictive slice (P slice) type or a bi predictive slice (B slice)

type. A block that belongs to a P slice and a B slice may be predicted according to inter prediction or intra prediction. The inter prediction with respect to the P slice may correspond to a uni-directional prediction for which only one reference picture list is used, whereas the prediction with respect to the B slice may correspond to the uni-directional prediction for which only one reference picture list is used or a bi-directional prediction for which a plurality of reference picture lists are used. According to the slice type to which the current block belongs, the size of the filter 420 generated based on the motion vector 410 may vary. For example, when the current block belongs to the P slice type, a limit of the size of the filter 420 generated based on the motion vector 410 may be less than a limit of the size of the filter 420 generated based on the motion vector 410 when the current block belongs to the B slice type.

To filter a prediction block 440, the image decoding apparatus 100 may determine a current sample P(3,3) in the prediction block 440, and may determine a neighboring sample of the current sample P(3,3), based on a direction of the motion vector 410. Also, the image decoding apparatus 100 may obtain a filtered prediction value of the current sample P(3,3) by using a prediction value of the neighboring sample.

In more detail, the image decoding apparatus 100 may determine candidate samples used to filter a current sample, based on the size of the filter 420. The candidate samples may correspond to samples of an image included in the filter 420 when a center of the filter 420 is positioned at a center of the current sample P(3,3). For example, when the filter 420 that is the aforementioned 5×5-square filter is used, candidate samples with respect to the current sample P(3,3) in the prediction block 440 of 8×8 may be P(1<=x(integer)<=5, 1<=y(integer)<=5).

The image decoding apparatus 100 may determine at least one neighboring sample from among the candidate samples, based on the direction of the motion vector 410. A neighboring sample from among the candidate samples may correspond to a sample that is used to filter the current sample P(3,3) and is positioned away from the current sample P(3,3) in the direction of the motion vector 410. For example, as illustrated in FIG. 4, neighboring samples of the current sample P(3,3) in the prediction block 440 of 8×8 may correspond to P(1,5), P(2,4), P(2,5), P(3,2), P(3,4), P(4,1), P(4,2) and P(5,1) which are positioned away from the current sample P(3,3) in a direction of 37 degrees. As described, because a blurring characteristic is reflected to the motion vector 410, when a prediction value of the current sample P(3,3) is filtered by using prediction values of the neighboring samples determined based on the direction of the motion vector 410, a residual value of the current sample P(3,3) may be minimized.

The image decoding apparatus 100 may determine a first weight of a current sample and a second weight of a neighboring sample, based on at least one of the size and the direction of the motion vector 410. Also, the filtered prediction value of the current sample P(3,3) may be obtained by using the prediction value of the current sample P(3,3) to which the first weight has been applied and a prediction value of the neighboring sample to which the second weight has been applied.

In more detail, when a center of the motion vector 410 is positioned at the center of the current sample P(3,3), a ratio r1/r of a length r1 of the motion vector 410 included in the current sample P(3,3) to an entire length r of the motion vector 410 may correspond to the first weight. Also, when the center of the motion vector 410 is positioned at the center of the current sample P(3,3), a ratio of a length of the motion vector 410 included in a neighboring sample to the entire length r of the motion vector 410 may correspond to the second weight. For example, the second weight with respect to a neighboring sample P(3,2) may be r2/r. In addition, a third weight with respect to samples that are not selected as a neighboring sample from among the candidate samples may be 0.

A reference numeral 430 of FIG. 4 may indicate a diagram of a first weight of the current sample P(3,3) with respect to the motion vector 410 of r∠θ=(5.73 px)∠(37 degree), a second weight of a neighboring sample, and a third weight with respect to samples that are not selected as the neighboring sample from among candidate samples. In the aforementioned example, a first weight W(3,3) of the current sample P(3,3) may be 1.25/5.73. A second weight {W(1,5), W(2,4), W(2,5), W(3,2), W(3,4), W(4,1), W(4,2) W(5,1)} with respect to the neighboring samples P(1,5), P(2,4), P(2,5), P(3,2), P(3,4), P(4,1), P(4,2), and P(5,1) may be {0.19/5.73, 0.85/5.73, 0.80/5.73, 0.40/5.73, 0.40/5.73, 0.80/5.73, 0.85/5.73, and 0.19/5.73}. Also, a third weight {W(1,1), W(1,2), W(1,3), W(1,4), W(2,1), W(2,2), W(2,3), W(3,1), W(3,5), W(4,3), W(4,4), W(4,5), W(5,2), W(5,3), W(5,4), W(5,5)} of samples P(1,1), P(1,2), P(1,3), P(1,4), P(2,1), P(2,2), P(2,3), P(3,1), P(3,5), P(4,3), P(4,4), P(4,5), P(5,2), P(5,3), P(5,4), and P(5,5) which are not selected as the neighboring sample from among candidate samples may be 0. Thus, the prediction value of the current sample P(3,3) may be filtered as in Equation 5.

$$\text{Filtered } P(3,3) = \{0.19*P(1,5) + 0.85*P(2,4) + 0.80*P(2,5) + 1.25*P(3,3) + 0.40*P(3,4) + 0.40*P(3,2) + 0.85P(4,2) + 0.80*P(4,1) + 0.19P(5,1)\} / \{1.25 + 2*(0.19 + 0.80 + 0.85 + 0.40)\} \quad \text{[Equation 5]}$$

As described above, a blurring characteristic is reflected to the motion vector 410, thus, when the prediction value of the current sample P(3,3) is filtered by using a prediction value of neighboring samples to which a weight has been applied based on at least one of the size and the direction of the motion vector 410, a residual value with respect to the current sample P(3,3) may be minimized.

Figure 5:
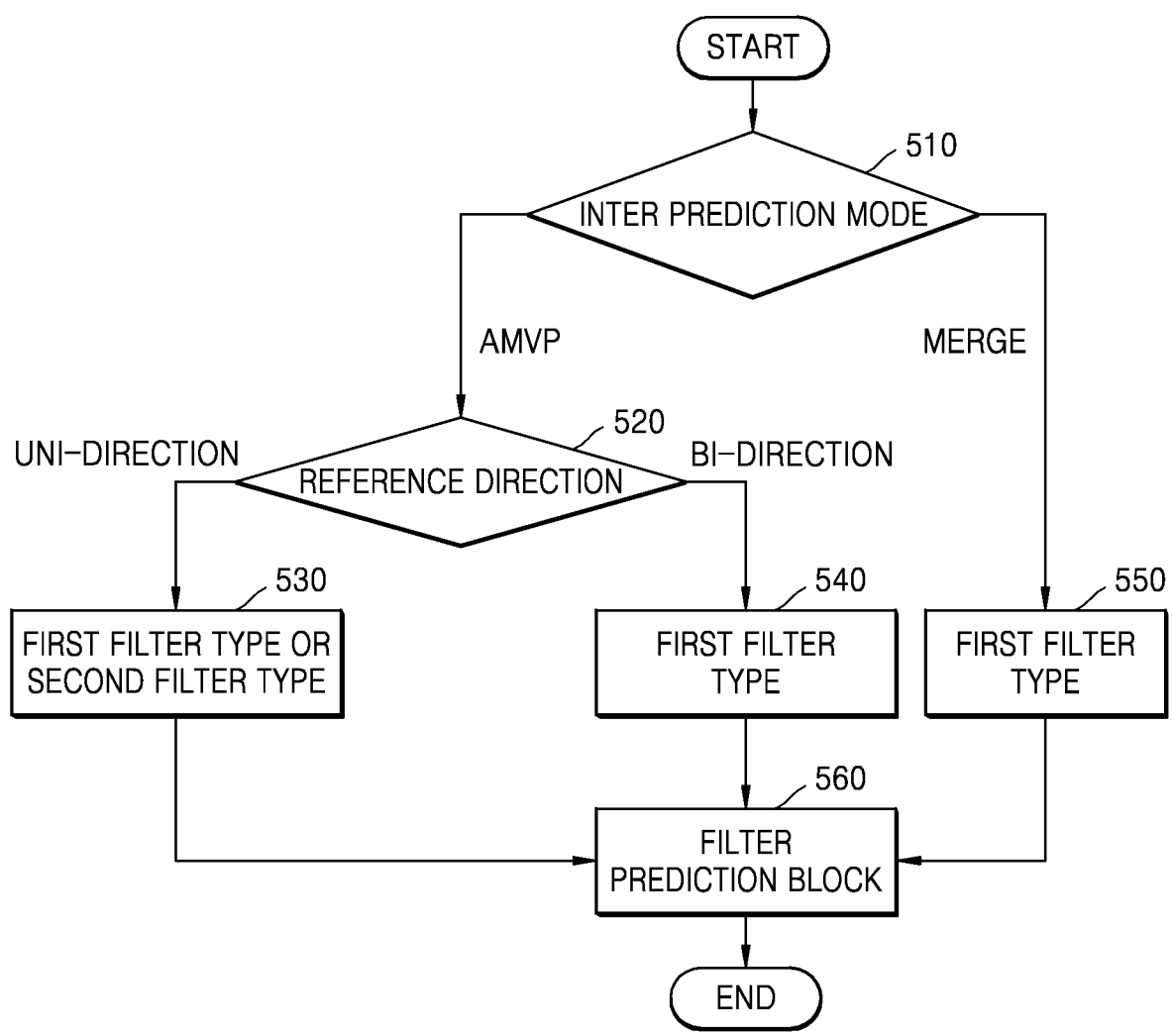
FIG. 5 is a flowchart illustrating how an image decoding apparatus determines a type of a filter to filter a prediction block, according to an embodiment.

FIG. 5 is a flowchart illustrating how an image decoding apparatus determines a type of a filter to filter a prediction block, according to an embodiment.

As described above with reference to FIG. 4, the image decoding apparatus 100 may determine the size of the filter 420, the candidate samples, the neighboring samples, the first weight with respect to the current sample, the second weight with respect to the neighboring samples, and the third weight with respect to the candidate samples, based on at least one of the size and the direction of the motion vector 410 of the current block. Hereinafter, for convenience of description, the filter 420 of FIG. 4 is referred to as a blur filter in which the second weight with respect to the neighboring samples corresponds to a ratio of a length r2 of the motion vector 410 included in the neighboring samples to an entire length r of the motion vector 410 when the center of the motion vector 410 is positioned at the center of the current sample P(3,3).

In addition to the blur filter, the image decoding apparatus 100 may filter a prediction block by using a general low pass filter. For example, the image decoding apparatus 100 may perform Gaussian blurring on the prediction block by using a Gaussian filter controlled according to a value. When a value is increased, intensity of filtering may be increased, but on the other hand, when a value is decreased, intensity of filtering may be decreased. Weights of the Gaussian filter with respect to a current sample and a neighboring sample may be determined by using Equation 6.

$$G(x, y) = \frac{1}{2\pi\sigma^2} e^{-\frac{x^2+y^2}{2\sigma^2}}$$ [Equation 6]

For example, a Gaussian filter with 5×5 size generated according to Equation 6 may be expressed by using Equation 7.

$$G(x, y) = \frac{1}{273} \begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 4 \end{bmatrix}$$ [Equation 7]

In a Gaussian filter 420, a value of a second weight with respect to a neighboring sample may be increased when the neighboring sample is close to a current sample, whereas a value of a second weight with respect to a neighboring sample may be decreased when the neighboring sample is distant from the current sample. A first weight with respect to the current sample corresponds to 41/273 according to Equation 6, and the first weight with respect to the current sample may be constantly greater than a second weight with respect to neighboring samples according to Equation 5.

In a same manner described with reference to FIG. 4 in which the size of the blur filter is determined, the image decoding apparatus 100 may determine a size of the Gaussian filter, based on at least one of a size and a direction of a motion vector. For example, the image decoding apparatus 100 may determine the width and the height of the filter to be the integer obtained by rounding up the size r of the motion vector 410 of the current block, as in Equation 1. As another example, as in Equation 2, the image decoding apparatus 100 may determine the width and the height of the filter to be the integer obtained by rounding up the maximum value from among r*cos θ that is the horizontal component size and r*sin θ that is the vertical component size of the motion vector 410 of the current block. As another example, as in Equation 3, the image decoding apparatus 100 may determine a width of the Gaussian filter to be the integer obtained by rounding up r*cos θ that is the horizontal direction size of the motion vector 410, and may determine the height of the Gaussian filter to be the integer obtained by rounding up r*sin θ that is the vertical direction size of the motion vector 410. As another example, according to Equation 4, the image decoding apparatus 100 may generate a Gaussian filter that corresponds to a square filter or a rectangular filter, which is the smallest one whose height and width correspond to an integer pixel distance and which may include the motion vector 410.

As described above with reference to FIG. 4, the blur filter determines neighboring samples to be used in filtering a current sample, based on a size and a direction of a motion vector, but on the other hand, the Gaussian filter may determine neighboring samples to be used in filtering the current sample, based on only the size of the motion vector, without consideration of the direction of the motion vector. For example, the image decoding apparatus 100 may determine the size of the Gaussian filter, based on the size of the motion vector 410, and may use all samples of an image as neighboring samples, all samples being included in the Gaussian filter when a center of the Gaussian filter is positioned at the current sample. All samples included in the Gaussian filter may be used in filtering the current sample even if they are not positioned away from the current sample in the direction of the motion vector 410.

The blur filter determines the second weight of the neighboring samples, based on at least one of the size and the direction of the motion vector 410, but on the other hand, the Gaussian filter may determine the second weight of the neighboring samples, based on only the size of the motion vector 410, without consideration of the direction of the motion vector 410. For example, the image decoding apparatus 100 may determine a value of the Gaussian filter, based on the size of the motion vector 410. In more detail, when the size of the motion vector 410 is increased, intensity of blurring may also be increased, thus, the image decoding apparatus 100 may increase a value when the size of the motion vector 410 is increased. On the other hand, when the size of the motion vector 410 is decreased, intensity of blurring may also be decreased, thus, the image decoding apparatus 100 may decrease a value when the size of the motion vector 410 is decreased.

The image decoding apparatus 100 may determine a filter type, based on an inter prediction mode of the current block. Also, the image decoding apparatus 100 may determine the filter type, based on a reference direction indicating at least one reference picture list to be used in inter prediction.

Methods of obtaining motion information of a current block may be divided according to the inter prediction mode, and the inter prediction mode may include a merge mode and an AMVP mode. As described above, the merge mode may obtain not only a motion vector of the current block but also to obtain a reference direction and a reference picture index from a neighboring block that is spatially adjacent to the current block or a collocated block that temporally corresponds to the current block. The AMVP mode may obtain only the motion vector of the current block from the neighboring block that is spatially adjacent to the current block or the collocated block that temporally corresponds to the current block.

Even if a same motion vector of a current block is used, the filter type may vary according to at least one of a method of determining a neighboring sample for filtering a current sample, a method of determining a first weight with respect to the current sample, and a method of determining a second weight with respect to the neighboring sample. For example, the filter type may include the blur filter and the Gaussian filter which are described above, and the blur filter and the Gaussian filter may be different from each other in a method of determining a neighboring sample for filtering a current sample, a method of determining a first weight with respect to the current sample, and a method of determining a second weight with respect to the neighboring sample.

The reference direction may include a uni-directional prediction mode indicating to perform inter prediction by using only one reference picture list, and a bi-directional prediction mode indicating to perform the inter prediction by using a plurality of reference picture lists.

For example, when an inter prediction mode of the current block is the AMVP mode, and a reference direction indicating at least one reference picture list to be used in inter prediction is a uni-direction, the image decoding apparatus 100 may determine the filter type to be a first filter type or a second filter type. Also, when the inter prediction mode of the current block is the AMVP mode, and the reference direction indicating at least one reference picture list to be used in the inter prediction is a bi-direction, the image decoding apparatus 100 may determine the filter type to be a first filter. An AMVP bi-directional prediction mode uses only one filter type, whereas an AMVP uni-directional prediction mode may use a plurality of filter types with respect to a prediction block.

In more detail, in operation 510, the bitstream obtainer 110 of the image decoding apparatus 100 may obtain, from a bitstream, inter prediction mode information indicating an inter prediction mode of a current block. When the inter prediction mode of the current block is the AMVP mode, in operation 520, the bitstream obtainer 110 of the image decoding apparatus 100 may obtain, from the bitstream, reference direction information indicating a reference direction of the inter prediction mode of the current block. When the inter prediction mode of the current block is the AMVP mode, and the reference direction of an inter prediction of the current block is a uni-direction, in operation 530, the decoder 120 of the image decoding apparatus 100 may determine a type of a filter to be one of the Gaussian filter and the blur filter, wherein the filter is to filter a prediction block of the current block. In more detail, the decoder 120 may determine the type of the filter to be one of the Gaussian filter and the blur filter, based on at least one of a size and a direction of a motion vector of the current block, a size of the prediction block, and a quantization parameter.

On the other hand, when the inter prediction mode of the current block is the AMVP mode, and the reference direction of the inter prediction of the current block is a bi-direction, in operation 530, the decoder 120 of the image decoding apparatus 100 may determine the type of the filter to be the Gaussian filter, wherein the filter is to filter the prediction block of the current block.

As another example, when the inter prediction mode of the current block is the merge mode, the image decoding apparatus 100 may determine the type of the filter to be a first filter type, without consideration of the reference direction indicating at least one reference picture list to be used in the inter prediction. The merge mode does not consider the reference direction and may use only one filter type with respect to the prediction block.

In more detail, in operation 510, the bitstream obtainer 110 of the image decoding apparatus 100 may obtain, from the bitstream, the inter prediction mode information indicating the inter prediction mode of the current block. Also, when the inter prediction mode of the current block is the merge mode, in operation 550, the decoder 120 of the image decoding apparatus 100 may determine, as the Gaussian filter, the type of the filter to filter the prediction, without consideration of the reference direction of the current block. In the aforementioned example, the first filter type corresponds to the Gaussian filter and the second filter type corresponds to the blur filter, but these may be vice versa.

As another example, when the inter prediction mode of the current block is the merge mode, the image decoding apparatus 100 may determine the type of the filter with respect to the prediction block of the current block to be equal to a type of a filter with respect to a merge candidate selected from a list of merge candidates, without consideration of the reference direction indicating at least one reference picture list to be used in the inter prediction.

Also, the image decoding apparatus 100 may obtain, from the bitstream, a first flag indicating whether to perform filtering on the prediction block of the current block. The first flag may be set with respect to each of block units partitioned from an image. The image decoding apparatus 100 may distinguish between a prediction block requiring filtering and a prediction block not requiring filtering, by using the first flag. For example, a value of the first flag for a block in which blurring has occurred in the image during an encoding process may be set as 1, and a value of the first flag for a block in which blurring did not occur may be set as 0. The bitstream obtainer 110 of the image decoding apparatus 100 may obtain the first flag of the current block from the bitstream, and the decoder 120 of the image decoding apparatus 100 may determine whether to perform filtering on the prediction block of the current block, based on a value of the first flag.

When the first flag indicates to perform filtering on the prediction block of the current block, the image decoding apparatus 100 may obtain, from the bitstream, a second flag indicating a type of a filter with respect to the prediction block. The second flag may be set with respect to each of block units partitioned from the image. The image decoding apparatus 100 may determine the type of the filter with respect to the prediction block of the current block, according to the second flag. For example, in a case where encoding and decoding performances are improved when filtering is performed on the current block by using the blur filter, compared to a case when filtering is performed on the current block by using the Gaussian filter, a value of the second flag may be set as 0 in the encoding process. On the other hand, in a case where encoding and decoding performances are improved when filtering is performed on the current block by using the Gaussian filter, compared to a case when filtering is performed on the current block by using the blur filter, the value of the second flag may be set as 1 in the encoding process. The bitstream obtainer 110 of the image decoding apparatus 100 may obtain the second flag of the current block from the bitstream, and the decoder 120 of the image decoding apparatus 100 may determine the type of the filter with respect to the prediction block of the current block, based on the value of the second flag.

The first flag and the second flag may be entropy encoded according to context-based adaptive variable length coding (CAVLC) or context-based adaptive binary arithmetic coding (CABAC), and then may be transmitted in the bitstream. The entropy-decoder 120 of the image decoding apparatus 100 may determine a context index with respect to the first flag of the current block, based on at least one of a size and a direction of a motion vector of the current block, a size of the current block, a size of a coding unit when the current block is partitioned from the coding unit, and a value of a first flag of a neighboring block adjacent to the current block. The entropy-decoder 120 of the image decoding apparatus 100 may perform entropy decoding on the first flag, based on the determined context index with respect to the first flag. Also, entropy-decoder 120 of the image decoding apparatus 100 may determine a context index with respect to a second flag, based on the context index with respect to the first flag. In more detail, the context index with respect to the second flag may be determined to be the same as the context index with respect to the first flag. Alternatively, the entropy-decoder 120 of the image decoding apparatus 100 may determine the context index with respect to the second flag of the current block, based on at least one of the size and the direction of the motion vector of the current block, the size of the current block, the size of the coding unit when the current block is partitioned from the coding unit, and a value of a second flag of a neighboring block adjacent to the current block. Also, the entropy-decoder 120 of the image decoding apparatus 100 may perform entropy decoding on the second flag, based on the determined context index with respect to the second flag.

Figure 6:
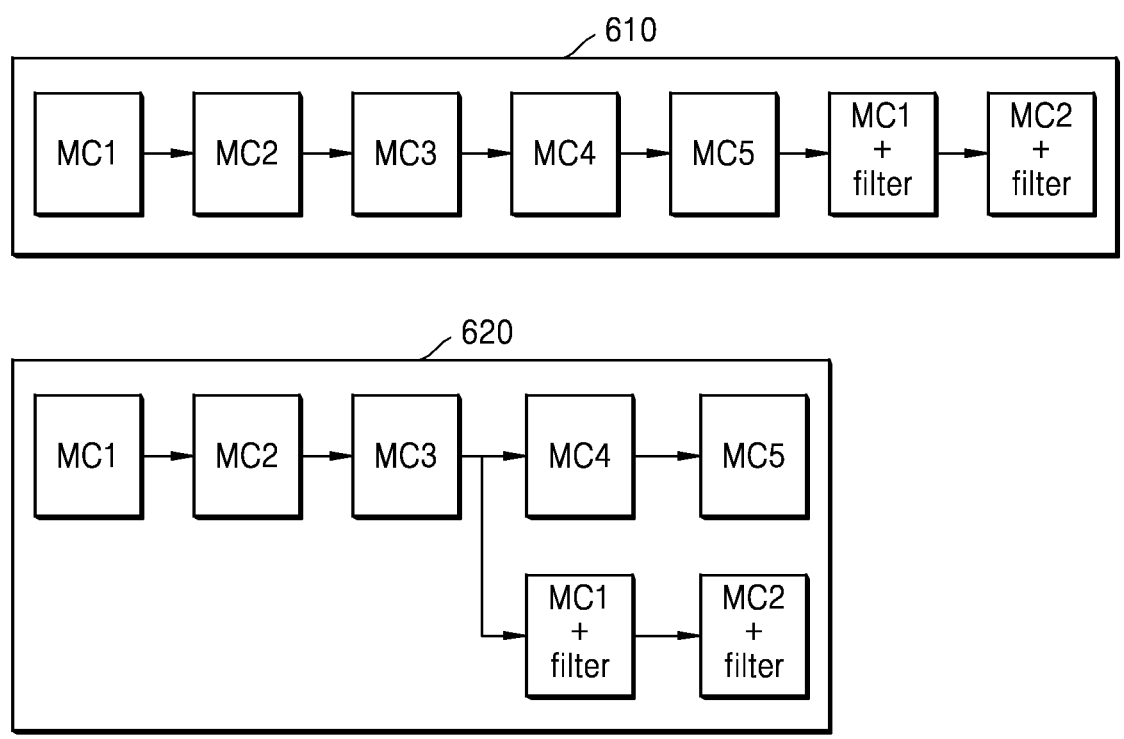
FIG. 6 illustrates a merge candidate list, according to an embodiment.

FIG. 6 illustrates a merge candidate list, according to an embodiment.

The image decoding apparatus 100 may configure a merge candidate list, and may select a merge block from the merge candidate list, according to a merge index obtained from a bitstream, the merge block being used to generate a prediction block of a current block. Also, as described above, when the image decoding apparatus 100 performs inter prediction according to a merge mode, the image decoding apparatus 100 generates the prediction block of the current block by using a reference direction, a reference picture index, and a motion vector which are of the merge block selected from the merge candidate list.

For example, the image decoding apparatus 100 may generate the merge candidate list including a spatial merge candidate and a temporal merge candidate. The spatial merge candidate may be a block that is spatially adjacent to the current block, and the temporal merge candidate may be a collocated block in an image that is encoded before a current image, the collocated block corresponding to the position of the current block. When the number of merge candidates including the spatial merge candidate and the temporal merge candidate is less than a preset maximum number of merge candidates, the image decoding apparatus 100 may add, to the merge candidate list, a combined merge candidate for bi-directional prediction by combining candidates that have been configured so far. Also, when the number of merge candidates is less than the preset maximum number of merge candidates even when the combined merge candidate is added, the image decoding apparatus 100 may add a zero motion vector to the merge candidate list.

A merge candidate index that the image decoding apparatus 100 obtained from the bitstream may indicate not only a merge candidate for generating the prediction block of the current block, the merge candidate being from the merge candidate list, but may also indicate whether to filter the prediction block of the current block. In more detail, when the number of merge candidates included in the merge candidate list corresponds to the preset maximum number of merge candidates, the image decoding apparatus 100 may add a filter merge candidate to the merge candidate list. The filter merge candidate may have a motion vector, a reference direction, and a reference picture index, which are equal to those of the merge block already included in the merge candidate list. However, when the merge candidate index obtained from the bitstream indicates to perform inter prediction by using the filter merge candidate, the image decoding apparatus 100 may filter a prediction block of the current block, the prediction block being obtained via the inter prediction. For example, the filter merge candidate may have a motion vector, a reference direction, and a reference picture index, which are equal to those of the temporal merge candidate or the spatial merge candidate. As another example, the filter merge candidate may have a motion vector, a reference direction, and a reference picture index, which are equal to those of a merge candidate that is first included in the merge candidate list. Also, when the merge candidate index obtained from the bitstream indicates to perform inter prediction by using the filter merge candidate, the image decoding apparatus 100 may generate a prediction block of the current block by using the temporal merge candidate or the spatial merge candidate, and then may filter the prediction block by using filter information determined based on at least one of a size and a direction of a motion vector of the temporal merge candidate or the spatial merge candidate. On the other hand, when the merge candidate index obtained from the bitstream indicates to perform the inter prediction by using the temporal merge candidate or the spatial merge candidate, the image decoding apparatus 100 may generate a prediction block of the current block by using the temporal merge candidate or the spatial merge candidate, and may not perform filtering on the prediction block. The number of filter merge candidates included in the merge candidate list may be determined based on at least one of a slice type, a size of the current block, a size of a coding unit when the current block is partitioned from the coding unit, and a quantization parameter. In more detail, a B slice type may further include filter merge candidates, compared to a P slice type. Also, when the size of the current block is increased, the number of filter merge candidates may be increased. Also, when the quantization parameter is increased, the number of filter merge candidates may be increased. Alternatively, the number of filter merge candidates included in the merge candidate list may be a predetermined fixed constant.

For example, a serial merge candidate list 610 and a parallel merge candidate list 620 may include 5 merge candidates due to a temporal merge candidate, a spatial merge candidate, a combined merge candidate, and a zero motion vector, and may newly include 2 filter merge candidates. A filter merge candidate MC1+filter that is first added to a merge candidate list may have motion information equal to motion information of a merge candidate MC1 that is first added to the merge candidate list, the motion information including a motion vector, a reference direction, and a reference picture index. Also, a filter merge candidate MC2+filter that is second added to the merge candidate list may have motion information equal to motion information of a merge candidate MC2 that is second added to the merge candidate list, the motion information including a motion vector, a reference direction, and a reference picture index.

A position of a filter merge candidate in a filter merge candidate list may be determined based on at least one of a slice type, a size of the current block, a size of a coding unit when the current block is partitioned from the coding unit, and a quantization parameter. Alternatively, a position of a filter merge candidate included in the merge candidate list may be a predetermined fixed position.

For example, filter merge candidates may be added to an end of the serial merge candidate list 610. In this case, the image decoding apparatus 100 may de-binarize merge indexes, which are obtained from the bitstream, according to unary binarization as in Table 1.

TABLE 1

| merge_idx | Bin string | | | | | | Description |
|---|---|---|---|---|---|---|---|
| 0 | 0 | | | | | | merge candidate 1 |
| 1 | 1 | 0 | | | | | merge candidate 2 |
| 2 | 1 | 1 | 0 | | | | merge candidate 3 |
| 3 | 1 | 1 | 1 | 0 | | | merge candidate 4 |
| 4 | 1 | 1 | 1 | 1 | 0 | | merge candidate 5 |
| 5 | 1 | 1 | 1 | 1 | 1 | 0 | merge candidate 1 with filter |
| 6 | 1 | 1 | 1 | 1 | 1 | 1 | 0 merge candidate 2 with filter |
| binIdx | 0 | 1 | 2 | 3 | 4 | 5 | 6 |

When a value of the merge index with respect to the serial merge candidate list 610, the merge index being obtained from the bitstream, is less than 5 that is a threshold value, the image decoding apparatus 100 may not perform filtering on the prediction block of the current block. Also, when the value of the merge index with respect to the serial merge candidate list 610, the merge index being obtained from the bitstream, is equal to or greater than 5 that is the threshold value, the image decoding apparatus 100 may perform filtering on the prediction block of the current block. In more detail, when the merge index with respect to the serial merge candidate list 610 is 5, the image decoding apparatus 100 may generate a prediction block of the current block by using the motion information of the merge candidate MC1 that is first added to the serial merge candidate list 610, and may filter the prediction block by using filter information determined based on at least one of a size and a direction of the motion vector of the merge candidate MC1 that is first added to the serial merge candidate list 610. Also, when the value of the merge index with respect to the serial merge candidate list 610 is 6, the image decoding apparatus 100 may generate a prediction block of the current block by using the motion information of the merge candidate MC2 that is second added to the serial merge candidate list 610, and may filter the prediction block by using filter information determined based on at least one of a size and a direction of the motion vector of the merge candidate MC2 that is second added to the serial merge candidate list 610.

As another example, filter merge candidates may be added to the middle of the parallel merge candidate list 620. In this case, the image decoding apparatus 100 may de-binarize the merge index obtained from the bitstream, as in Table 2.

TABLE 2

| merge_idx | Bin string | | | | | Description |
|---|---|---|---|---|---|---|
| 0 | 0 | | | | | merge candidate 1 |
| 1 | 1 | 0 | | | | merge candidate 2 |
| 2 | 1 | 1 | 0 | | | merge candidate 3 |
| 3 | 1 | 1 | 1 | 0 | | merge candidate 4 |
| 4 | 1 | 1 | 1 | 1 | 0 | merge candidate 5 |
| 5 | 0 | 1 | 1 | 0 | | merge candidate 1 with filter |
| 6 | 1 | 0 | 1 | 1 | 0 | merge candidate 2 with filter |
| binIdx | 0 | 1 | 2 | 3 | 4 | |

A branching position in the parallel merge candidate list 620 to which a filter merge candidate is added in a parallel manner with respect to a merge candidate may be between a third merge candidate and a fourth merge candidate. As described above, the branching position to which the filter merge candidate is added in a parallel manner with respect to the merge candidate may be determined based on at least one of the slice type, the size of the current block, the size of the coding unit when the current block is partitioned from the coding unit, and the quantization parameter. When a probability blurring is to occur is increased, a necessity to perform filtering on a prediction block may be increased, and when a branching position is a fore position, the number of bits of a merge index indicating a filter merge candidate may be decreased, thus, when a probability blurring is to occur in the current block is increased, the branching position may be positioned at a fore part of the parallel merge candidate list 620. In more detail, a branching position of a P slice type may precede a branching position of a B slice type, and when the size of the current block is large and the quantization parameter is great, a branching position may be a fore position. Alternatively, a position of the filter merge candidate in the merge candidate list may be a predetermined fixed position.

When the merge index is de-binarized according to Table 2, the maximum number of bits of the merge index may be decreased compared to a case in which the merge index is de-binarized according to Table 1. However, when the merge index is de-binarized according to Table 2, the complexity of encoding and decoding may be increased compared to the case in which the merge index is de-binarized according to Table 1.

When a value of a merge index with respect to the parallel merge candidate list 620, the merge index being obtained from the bitstream, is less than 5 that is the threshold value, the image decoding apparatus 100 may not perform filtering on the prediction block of the current block. Also, when the value of the merge index with respect to the parallel merge candidate list 620, the merge index being obtained from the bitstream, is equal to or greater than 5 that is the threshold value, the image decoding apparatus 100 may perform filtering on the prediction block of the current block. In more detail, when the merge index with respect to the parallel merge candidate list 620 is 5, the image decoding apparatus 100 may generate a prediction block of the current block by using the motion information of the merge candidate MC1 that is first added to the parallel merge candidate list 620, and may filter the prediction block by using filter information determined based on at least one of a size and a direction of the motion vector of the merge candidate MC1 that is first added to the parallel merge candidate list 620. Also, when the value of the merge index with respect to the parallel merge candidate list 620 is 6, the image decoding apparatus 100 may generate a prediction block of the current block by using the motion information of the merge candidate MC2 that is second added to the parallel merge candidate list 620, and may filter the prediction block by using filter information determined based on at least one of a size and a direction of the motion vector of the merge candidate MC2 that is second added to the parallel merge candidate list 620.

Figure 7:
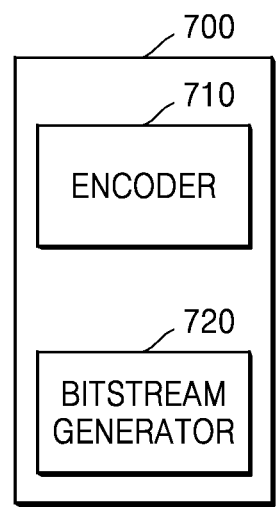
FIG. 7 is a block diagram of an image encoding apparatus, according to an embodiment.

FIG. 7 is a block diagram of an image encoding apparatus, according to an embodiment.

An image encoding apparatus 700 may include a central processor that generally controls an encoder 710 and a bitstream generator 720. Alternatively, the encoder 710 and the bitstream generator 720 may correspond to one processor or may correspond to a plurality of processors that interoperate with each other. Alternatively, the encoder 710 and the bitstream generator 720 may be controlled by an external processor of the image encoding apparatus 700.

The decoder 120 may partition an image into one or more blocks.

As described above with reference to FIG. 1, a "block" may indicate a data unit of inter prediction which is determined by the image encoding apparatus 700 to encode the image. For example, the block may correspond to a prediction unit that is a data unit on which inter prediction or intra prediction such as HEVC is to be performed. As another example, the block may correspond to a coding unit determined based on block shape information. The coding unit determined based on the block shape information will be described in detail below with reference to FIGS. 10 through 23.

The encoder 710 may obtain a motion vector of a current block partitioned from the image. Also, the encoder 710 may obtain a prediction block of the current block by performing inter prediction on the current block, based on the motion vector.

As described above with reference to FIG. 1, the motion vector may be position information about a block in a reference picture to be used to predict the current block. The encoder 710 may obtain the motion vector of the current block by using a merge mode or an AMVP mode, and may generate an optimized prediction block of the current block from a previously-decoded reference image, based on the motion vector.

The encoder 710 may determine filter information, based on at least one of a size and a direction of the motion vector of the current block. Also, the encoder 710 may filter the prediction block of the current block by using the determined filter information. The image encoding apparatus 700 may determine the filter information in a same manner with which the image decoding apparatus 100 determines filter information based on a motion vector which is described above with reference to FIGS. 4 through 6.

The encoder 710 may encode a residual block between a filtered prediction block and the current block. In more detail, the encoder 710 may generate syntax elements of the residual block which are compressed via an encoding process including transformation, quantization, and entropy encoding.

Also, the encoder 710 may reconstruct the current block by using the filtered prediction block and the residual block.

The bitstream generator 720 may generate a bitstream including the encoded residual block. In more detail, the bitstream generator 720 may transmit the bitstream including the syntax elements of the residual block to the image decoding apparatus 100.

A residual block according to the related art may correspond to a difference between original data of the current block and a prediction block generated according to inter prediction, whereas the residual block encoded by the encoder 710 may correspond to a difference between the original data of the current block and the prediction block filtered based on the motion vector.

Figure 8:
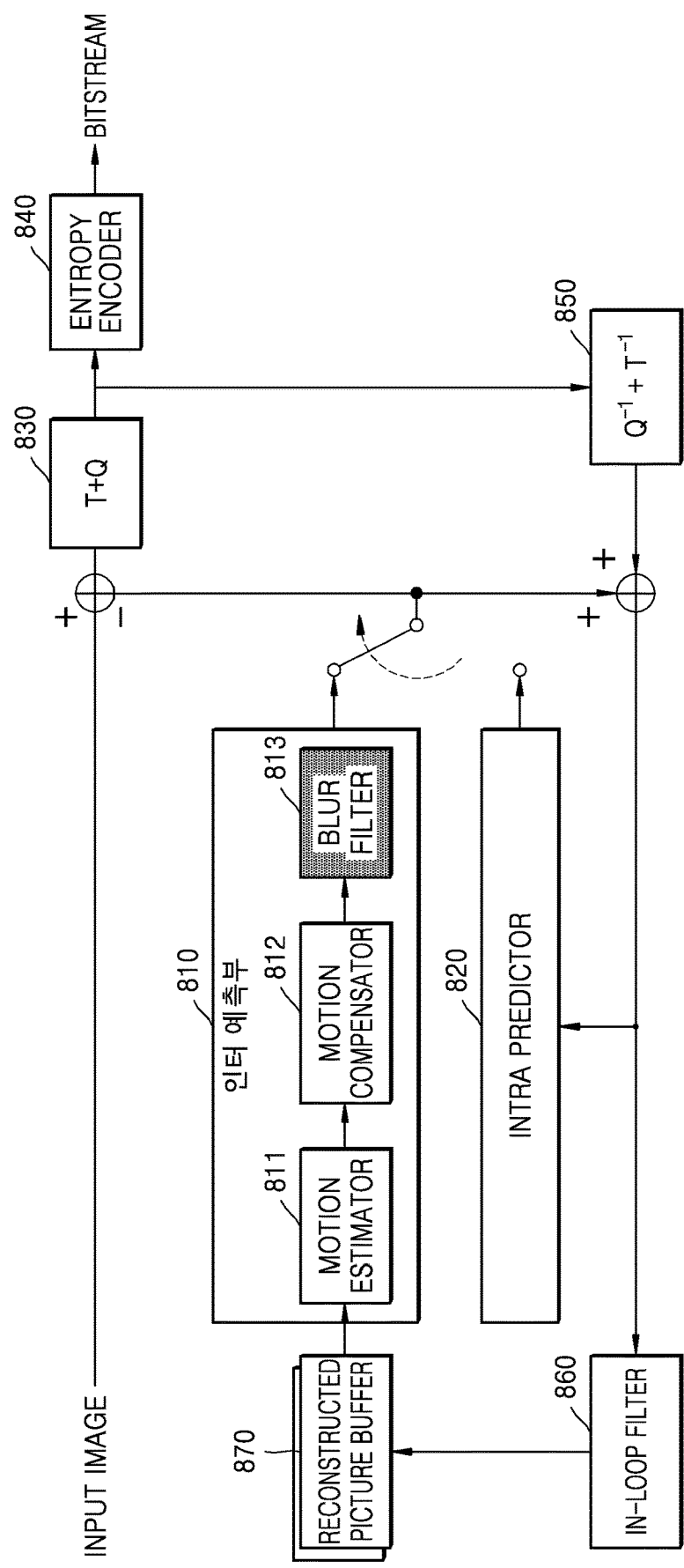
FIG. 8 is a block diagram of an encoder included in an image encoding apparatus, according to an embodiment.

FIG. 8 is a block diagram of an encoder included in an image encoding apparatus, according to an embodiment.

The decoder 120 may include an inter predictor 810, an intra predictor 820, a transformer and quantizer 830, an entropy encoder 840, an inverse-quantizer and inverse-transformer 850, an in-loop filter 860, and a reconstructed picture buffer 870. For convenience of description, in FIG. 8, the encoder 710 is divided into a plurality of modules according to functions, but as described above, the encoder 710 may correspond to one processor.

The inter predictor 810 may generate the prediction block of the current block by using a reference picture stored in the reconstructed picture buffer 870, and may filter the prediction block, based on a motion vector of the current block. In more detail, the inter predictor 810 may include a motion estimator 811, a motion compensator 812, and a blur filter 813. The motion estimator 811 may estimate an optimal block for predicting the current block, the optimal block being from reference pictures, which are stored in the reconstructed picture buffer 870, of the current block. The motion compensator 812 may generate the prediction block of the current block by using motion information including the motion vector of the current block which is obtained in a motion estimation process.

The blur filter 813 may filter the prediction block, based on the motion vector of the current block. As described above, the motion vector may include a blurring characteristic of the current block, thus, when a blurring artifact occurred in the current block, filtering performed by the blur filter 813 may effectively improve encoding and decoding performances.

Unlike the inter predictor 810 configured to generate a prediction block, based on a temporal correlation, the intra predictor 820 may generate a prediction block by using a spatial correlation between images.

The transformer and quantizer 830 may obtain transform coefficients which are compressed due to quantization by transforming and quantizing a residual block between the filtered prediction block and the current block. The entropy encoder 840 may output a bitstream including syntax elements of the residual block by entropy encoding the quantized transform coefficients. For example, the entropy encoder 840 may scan the quantized transform coefficients according to a set order, and may generate the syntax elements of the residual block by performing arithmetic encoding and binarizing on the scanned quantized transform coefficients.

The inverse-quantizer and inverse-transformer 850 may reconstruct data of the residual block by performing inverse quantization and inverse transformation on the quantized transform coefficients.

The in-loop filter 860 may filter data of a spatial domain, the data being reconstructed by adding data of the prediction block and the data of the residual block. For example, the in-loop filter 860 may output a reconstructed image by applying a de-blocking filter and an SAO filter to the reconstructed data of the spatial domain. Also, images output from the in-loop filter 860 may be stored in the reconstructed picture buffer 870.

Figure 9:
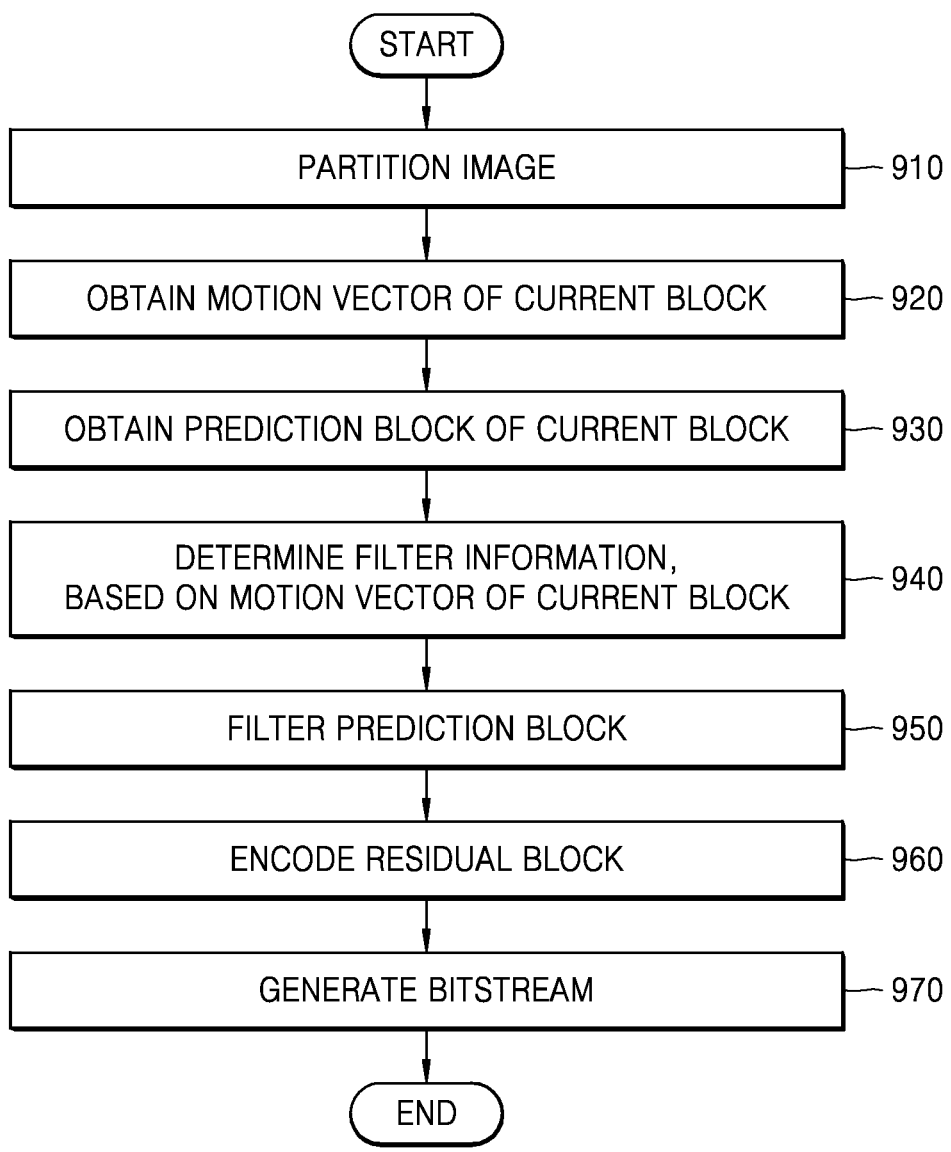
FIG. 9 is a flowchart of a method by which an image encoding apparatus encodes an image, according to an embodiment.

FIG. 9 is a flowchart of a method by which an image encoding apparatus encodes an image, according to an embodiment.

In operation 910, the image encoding apparatus 700 may partition an image into one or more blocks. In operation 920, the image encoding apparatus 700 may obtain a motion vector of a current block partitioned from the image. In operation 930, the image encoding apparatus 700 may obtain a prediction block of the current block by performing inter prediction on the current block, based on the motion vector. In operation 940, the image encoding apparatus 700 may determine filter information, based on at least one of a size and a direction of the motion vector of the current block. In operation 950, the image encoding apparatus 700 may filter the prediction block by using the filter information determined in operation 940. In operation 960, the image encoding apparatus 700 may encode a residual block between the filtered prediction block and original data of the current block. In operation 970, the image encoding apparatus 700 may generate a bitstream including the encoded residual block.

Operations 910 to 960 may be performed by the encoder 710 of the image encoding apparatus 700. Also, operation 970 may be performed by the bitstream generator 720.

As described above, in a case where occurrence of blurring differs in frames, when a prediction block of a current frame is generated by using a previous frame that is not compensated for, encoding and decoding performances may not be efficient. However, because a blurring characteristic occurred in the current block may be reflected to the motion vector of the current block, when a prediction block of a current block is filtered based on a motion vector of the current block, a residual block is minimized such that prediction performance may be improved.

Hereinafter, with reference to FIGS. 10 to 23, a method of determining a data unit that may be used by the image decoding apparatus 100 according to an embodiment in the image decoding process will be described. The operation of the image encoding apparatus 150 may be similar to or opposite to various embodiments of the operation of the image decoding apparatus 100 described below.

Figure 10:
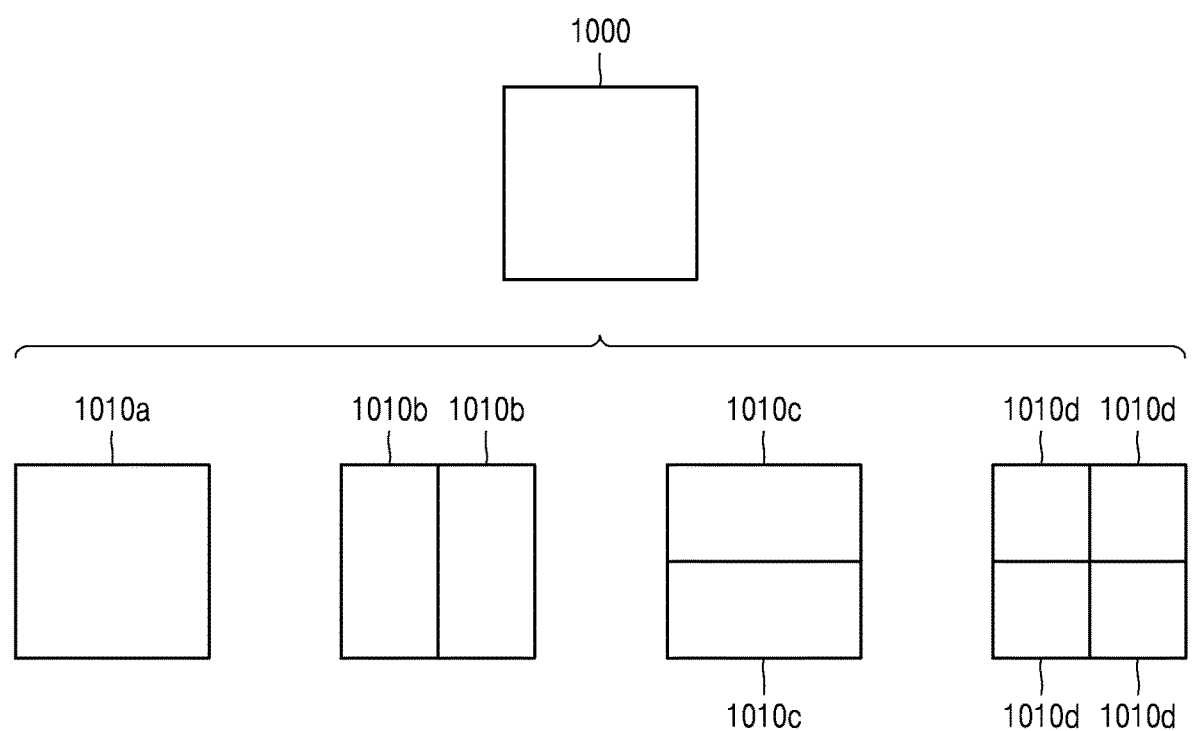
FIG. 10 illustrates an operation of determining one or more coding units by partitioning a current coding unit, according to an embodiment.

FIG. 10 illustrates an operation, performed by the image decoding apparatus 100, of determining one or more coding units by partitioning a current coding unit, according to an embodiment.

According to an embodiment, the image decoding apparatus 100 may determine a shape of a coding unit by using block shape information, and determine a partitioning method of the coding unit by using partition shape information. That is, a coding unit partitioning method indicated by the partition shape information may be determined based on a block shape indicated by the block shape information used by the image decoding apparatus 100.

According to an embodiment, the image decoding apparatus 100 may use the block shape information indicating that the current coding unit has a square shape. For example, the image decoding apparatus 100 may determine whether not to partition a square coding unit, whether to vertically partition the square coding unit, whether to horizontally partition the square coding unit, or whether to partition the square coding unit into four coding units, based on the partition shape information. Referring to FIG. 10, when the block shape information of a current coding unit 1000 indicates a square shape, the image decoding apparatus 100 may determine that a coding unit 1010a having the same size as the current coding unit 1000 is not partitioned, based on the partition shape information indicating not to perform partitioning, or may determine coding units 1010b, 1010c, or 1010d partitioned based on the partition shape information indicating a predetermined partitioning method.

Referring to FIG. 10, according to an embodiment, the image decoding apparatus 100 may determine two coding units 1010b obtained by partitioning the current coding unit 1000 in a vertical direction, based on the partition shape information indicating to perform partitioning in a vertical direction. The image decoding apparatus 100 may determine two coding units 1010c obtained by partitioning the current coding unit 1000 in a horizontal direction, based on the partition shape information indicating to perform partitioning in a horizontal direction. The image decoding apparatus 100 may determine four coding units 1010d obtained by partitioning the current coding unit 1000 in vertical and horizontal directions, based on the partition shape information indicating to perform partitioning in vertical and horizontal directions. However, partitioning methods of the square coding unit are not limited to the above-described methods, and the partition shape information may indicate various methods. Predetermined partitioning methods of partitioning the square coding unit will be described in detail below in relation to various embodiments.

FIG. 11 illustrates an operation, performed by the image decoding apparatus 100, of determining one or more coding units by partitioning a non-square coding unit, according to an embodiment.

According to an embodiment, the image decoding apparatus 100 may use block shape information indicating that a current coding unit has a non-square shape. The image decoding apparatus 100 may determine whether not to partition the non-square current coding unit or whether to partition the non-square current coding unit by using a predetermined partitioning method, based on partition shape information. Referring to FIG. 11, when the block shape information of a current coding unit 1100 or 1150 indicates a non-square shape, the image decoding apparatus 100 may determine that a coding unit 1110 or 1160 having the same size as the current coding unit 1100 or 1150 is not partitioned, based on the partition shape information indicating not to perform partitioning, or determine coding units 1120a and 1120b, 1130a to 1130c, 1170a and 1170b, or 1180a to 1180c partitioned based on the partition shape information indicating a predetermined partitioning method. Predetermined partitioning methods of partitioning a non-square coding unit will be described in detail below in relation to various embodiments.

According to an embodiment, the image decoding apparatus 100 may determine a partitioning method of a coding unit by using the partition shape information and, in this case, the partition shape information may indicate the number of one or more coding units generated by partitioning a coding unit. Referring to FIG. 11, when the partition shape information indicates to partition the current coding unit 1100 or 1150 into two coding units, the image decoding apparatus 100 may determine two coding units 1120a and 1120b, or 1170a and 1170b included in the current coding unit 1100 or 1150, by partitioning the current coding unit 1100 or 1150 based on the partition shape information.

According to an embodiment, when the image decoding apparatus 100 partitions the non-square current coding unit 1100 or 1150 based on the partition shape information, the location of a long side of the non-square current coding unit 1100 or 1150 may be considered. For example, the image decoding apparatus 100 may determine a plurality of coding units by dividing a long side of the current coding unit 1100 or 1150 considering the shape of the current coding unit 1100 or 1150.

According to an embodiment, when the partition shape information indicates to partition a coding unit into an odd number of blocks, the image decoding apparatus 100 may determine an odd number of coding units included in the current coding unit 1100 or 1150. For example, when the partition shape information indicates to partition the current coding unit 1100 or 1150 into three coding units, the image decoding apparatus 100 may partition the current coding unit 1100 or 1150 into three coding units 1130a, 1130b, and 1130c, or 1180a, 1180b, and 1180c. According to an embodiment, the image decoding apparatus 100 may determine an odd number of coding units included in the current coding unit 1100 or 1150, and not all the determined coding units have the same size. For example, a predetermined coding unit 1130b or 1180b from among the determined odd number of coding units 1130a, 1130b, and 1130c, or 1180a, 1180b, and 1180c may have a size different from the size of the other coding units 1130a and 1130c, or 1180a and 1180c. That is, coding units which may be determined by partitioning the current coding unit 1100 or 1150 may have multiple sizes and, in some cases, all of the odd number of coding units 1130a, 1130b, and 1130c, or 1180a, 1180b, and 1180c may have different sizes.

According to an embodiment, when the partition shape information indicates to partition a coding unit into an odd number of blocks, the image decoding apparatus 100 may determine an odd number of coding units included in the current coding unit 1100 or 1150, and put a predetermined restriction on at least one coding unit from among the odd number of coding units generated by partitioning the current coding unit 1100 or 1150. Referring to FIG. 11, the image decoding apparatus 100 may allow a decoding method of the coding unit 1130b or 1180b to be different from that of the other coding units 1130a and 1130c, or 1180a and 1180c, wherein the coding unit 1130b or 1180b is at a center location from among the three coding units 1130a, 1130b, and 1130c, or 1180a, 1180b, and 1180c generated by partitioning the current coding unit 1100 or 1150. For example, the image decoding apparatus 100 may restrict the coding unit 1130b or 1180b at the center location to be no longer partitioned or to be partitioned by only a predetermined number of times, unlike the other coding units 1130a and 1130c, or 1180a and 1180c.

Figure 12:
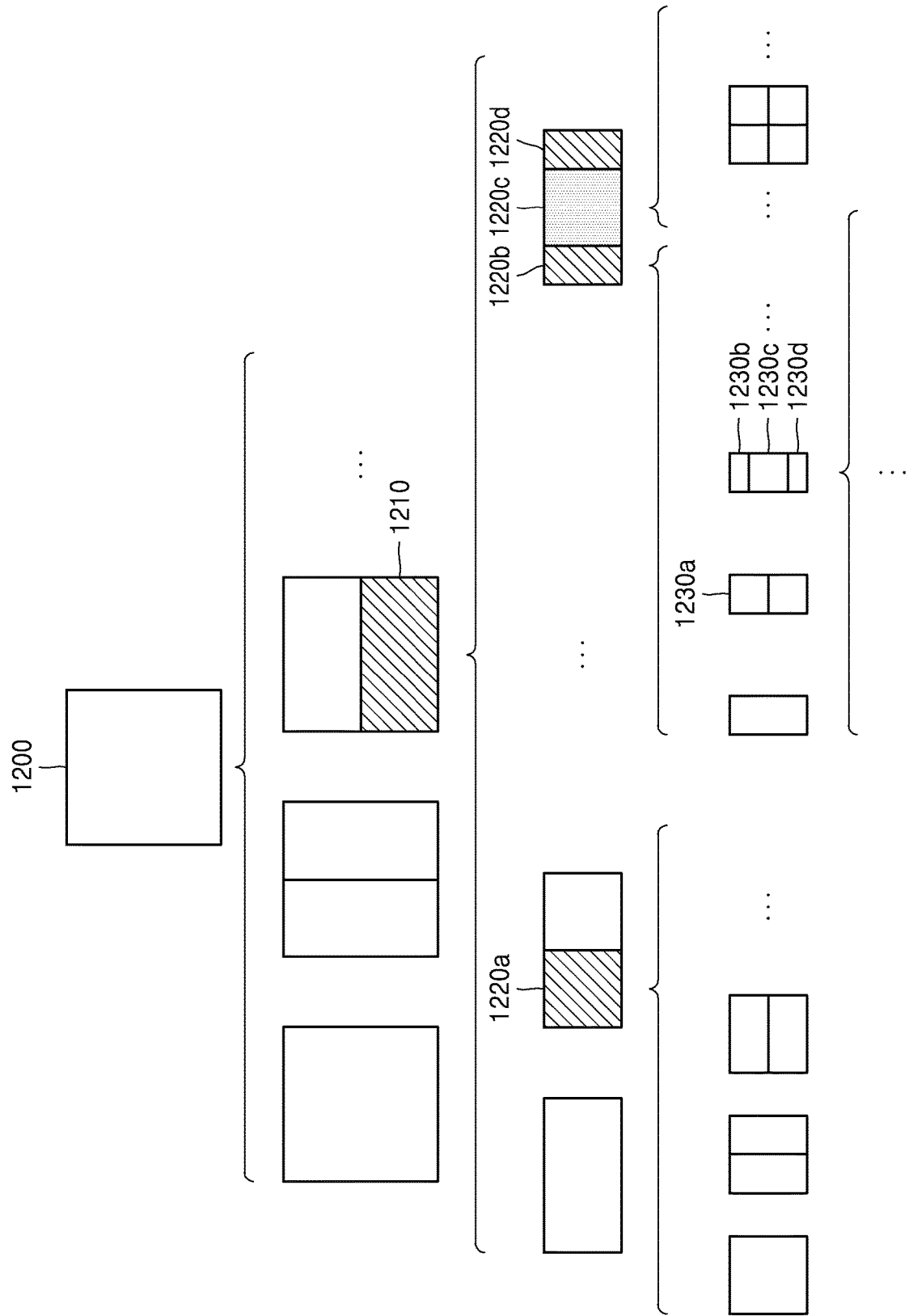
FIG. 12 illustrates an operation of partitioning a coding unit, based on at least one of block shape information and partition shape information, according to an embodiment.

FIG. 12 illustrates an operation, performed by the image decoding apparatus 100, of partitioning a coding unit based on at least one of block shape information and partition shape information, according to an embodiment.

According to an embodiment, the image decoding apparatus 100 may determine to or not to partition a square first coding unit 1200 into coding units, based on at least one of the block shape information and the partition shape information. According to an embodiment, when the partition shape information indicates to partition the first coding unit 1200 in a horizontal direction, the image decoding apparatus 100 may determine a second coding unit 1210 by partitioning the first coding unit 1200 in a horizontal direction. A first coding unit, a second coding unit, and a third coding unit used according to an embodiment are terms used to understand a relation before and after partitioning a coding unit. For example, a second coding unit may be determined by partitioning a first coding unit, and a third coding unit may be determined by partitioning the second coding unit. It will be understood that the structure of the first, second, and third coding units follows the above descriptions.

According to an embodiment, the image decoding apparatus 100 may determine to or not to partition the determined second coding unit 1210 into coding units, based on at least one of the block shape information and the partition shape information. Referring to FIG. 12, the image decoding apparatus 100 may or may not partition the non-square second coding unit 1210, which is determined by partitioning the first coding unit 1200, into one or more third coding units 1220a, or 1220b, 1220c, and 1220d based on at least one of the block shape information and the partition shape information. The image decoding apparatus 100 may obtain at least one of the block shape information and the partition shape information, and determine a plurality of various-shaped second coding units (e.g., 1210) by partitioning the first coding unit 1200, based on the obtained at least one of the block shape information and the partition shape information, and the second coding unit 1210 may be partitioned by using the partitioning method of the first coding unit 1200, based on at least one of the block shape information and the partition shape information. According to an embodiment, when the first coding unit 1200 is partitioned into the second coding units 1210 based on at least one of the block shape information and the partition shape information of the first coding unit 1200, the second coding unit 1210 may also be partitioned into the third coding units 1220a, or 1220b, 1220c, and 1220d based on at least one of the block shape information and the partition shape information of the second coding unit 1210. That is, a coding unit may be recursively partitioned based on at least one of the block shape information and the partition shape information of each coding unit. Therefore, a square coding unit may be determined by partitioning a non-square coding unit, and a non-square coding unit may be determined by recursively partitioning the square coding unit. Referring to FIG. 12, a predetermined coding unit from among an odd number of third coding units 1220b, 1220c, and 1220d determined by partitioning the non-square second coding unit 1210 (e.g., a coding unit at a center location or a square coding unit) may be recursively partitioned. According to an embodiment, the square third coding unit 1220c from among the odd number of third coding units 1220b, 1220c, and 1220d may be partitioned in a horizontal direction into a plurality of fourth coding units. A non-square fourth coding unit from among the plurality of fourth coding units may be partitioned into a plurality of coding units. For example, the non-square fourth coding unit 1240 may be partitioned into an odd number of coding units 1250a, 1250b, and 1250c.

A method that may be used to recursively partition a coding unit will be described below in relation to various embodiments.

According to an embodiment, the image decoding apparatus 100 may determine to partition each of the third coding units 1220a, or 1220b, 1220c, and 1220d into coding units or not to partition the second coding unit 1210, based on at least one of the block shape information and the partition shape information. According to an embodiment, the image decoding apparatus 100 may partition the non-square second coding unit 1210 into the odd number of third coding units 1220b, 1220c, and 1220d. The image decoding apparatus 100 may put a predetermined restriction on a predetermined third coding unit from among the odd number of third coding units 1220b, 1220c, and 1220d. For example, the image decoding apparatus 100 may restrict the third coding unit 1220c at a center location from among the odd number of third coding units 1220b, 1220c, and 1220d to be no longer partitioned or to be partitioned by a settable number of times. Referring to FIG. 12, the image decoding apparatus 100 may restrict the third coding unit 1220c, which is at the center location from among the odd number of third coding units 1220b, 1220c, and 1220d included in the non-square second coding unit 1210, to be no longer partitioned, to be partitioned by using a predetermined partitioning method (e.g., partitioned into only four coding units or partitioned by using a partitioning method of the second coding unit 1210), or to be partitioned by only a predetermined number of times (e.g., partitioned by only n times (where n>0)). However, the restrictions on the third coding unit 1220c at the center location are not limited to the above-described examples, and may include various restrictions for decoding the third coding unit 1220c at the center location differently from the other third coding units 1220b and 1220d.

According to an embodiment, the image decoding apparatus 100 may obtain at least one of the block shape information and the partition shape information, which is used to partition a current coding unit, from a predetermined location in the current coding unit.

Figure 13:
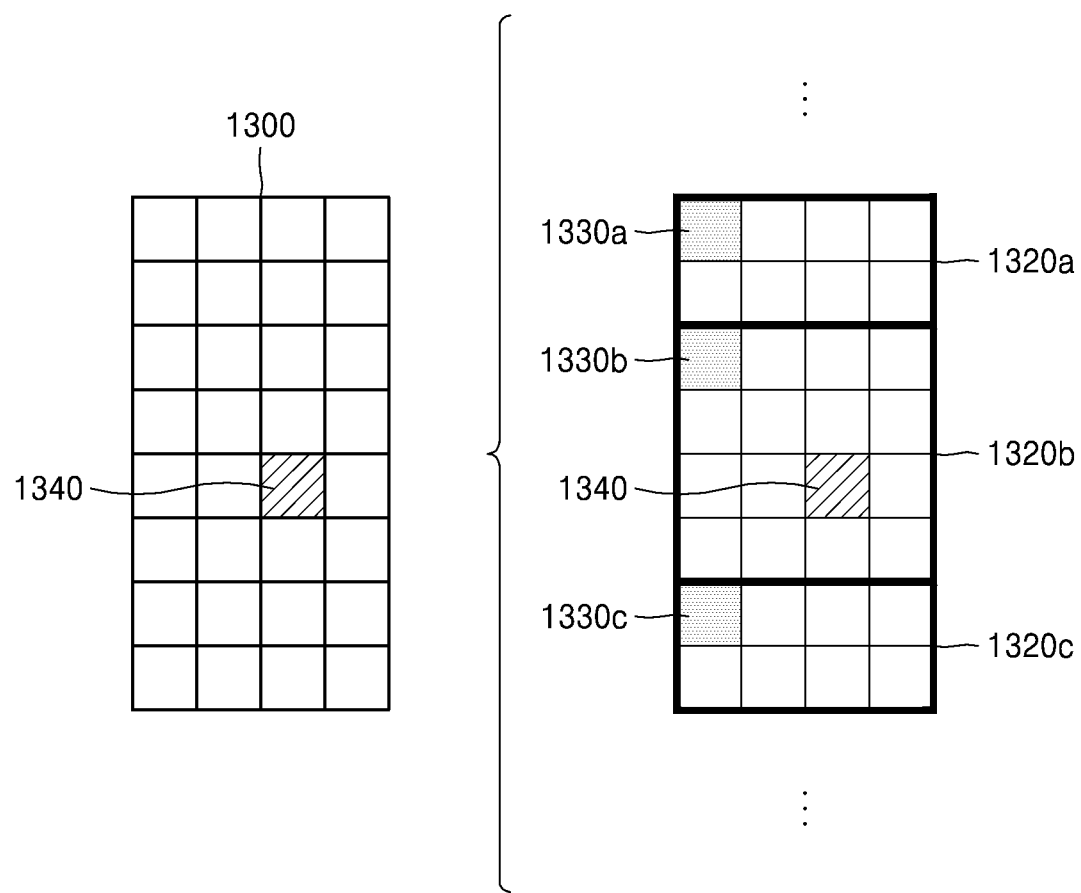
FIG. 13 illustrates a method of determining a predetermined coding unit from among an odd number of coding units, according to an embodiment.

FIG. 13 illustrates a method, performed by the image decoding apparatus 100, of determining a predetermined coding unit from among an odd number of coding units, according to an embodiment. Referring to FIG. 13, at least one of block shape information and partition shape information of a current coding unit 1300 may be obtained from a sample of a predetermined location from among a plurality of samples included in the current coding unit 1300 (e.g., a sample 1340 of a center location). However, the predetermined location in the current coding unit 1300, from which at least one of the block shape information and the partition shape information may be obtained, is not limited to the center location in FIG. 13, and may include various locations included in the current coding unit 1300 (e.g., top, bottom, left, right, top left, bottom left, top right, and bottom right locations). The image decoding apparatus 100 may obtain at least one of the block shape information and the partition shape information from the predetermined location and determine to or not to partition the current coding unit into various-shaped and various-sized coding units.

According to an embodiment, when the current coding unit is partitioned into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may partition the current coding unit into a plurality of coding units, and determine a coding unit at a predetermined location.

FIG. 13 illustrates a method, performed by the image decoding apparatus 100, of determining a coding unit of a predetermined location from among an odd number of coding units, according to an embodiment.

According to an embodiment, the image decoding apparatus 100 may use information indicating locations of the odd number of coding units, to determine a coding unit at a center location from among the odd number of coding units. Referring to FIG. 13, the image decoding apparatus 100 may determine an odd number of coding units 1320a, 1320b, and 1320c by partitioning the current coding unit 1300. The image decoding apparatus 100 may determine a coding unit 1320b at a center location by using information about locations of the odd number of coding units 1320a to 1320c. For example, the image decoding apparatus 100 may determine the coding unit 1320b of the center location by determining the locations of the coding units 1320a, 1320b, and 1320c based on information indicating locations of predetermined samples included in the coding units 1320a, 1320b, and 1320c. In more detail, the image decoding apparatus 100 may determine the coding unit 1320b at the center location by determining the locations of the coding units 1320a, 1320b, and 1320c based on information indicating locations of top left samples 1330a, 1330b, and 1330c of the coding units 1320a, 1320b, and 1320c.

According to an embodiment, the information indicating the locations of the top left samples 1330a, 1330b, and 1330c, which are included in the coding units 1320a, 1320b, and 1320c, respectively, may include information about locations or coordinates of the coding units 1320a, 1320b, and 1320c in a picture. According to an embodiment, the information indicating the locations of the top left samples 1330a, 1330b, and 1330c, which are included in the coding units 1320a, 1320b, and 1320c, respectively, may include information indicating widths or heights of the coding units 1320a, 1320b, and 1320c included in the current coding unit 1300, and the widths or heights may correspond to information indicating differences between the coordinates of the coding units 1320a, 1320b, and 1320c in the picture. That is, the image decoding apparatus 100 may determine the coding unit 1320b at the center location by directly using the information about the locations or coordinates of the coding units 1320a, 1320b, and 1320c in the picture, or by using the information about the widths or heights of the coding units, which correspond to the difference values between the coordinates.

According to an embodiment, information indicating the location of the top left sample 1330a of the upper coding unit 1320a may include a coordinate (xa, ya), information indicating the location of the top left sample 1330b of the middle coding unit 1320b may include a coordinate (xb, yb), and information indicating the location of the top left sample 1330c of the lower coding unit 1320c may include a coordinate (xc, yc). The image decoding apparatus 100 may determine the middle coding unit 1320b by using the coordinates of the top left samples 1330a, 1330b, and 1330c which are included in the coding units 1320a, 1320b, and 1320c, respectively. For example, when the coordinates of the top left samples 1330a, 1330b, and 1330c are sorted in an ascending or descending order, the coding unit 1320b including the coordinate (xb, yb) of the sample 1330b at a center location may be determined as a coding unit at a center location from among the coding units 1320a, 1320b, and 1320c determined by partitioning the current coding unit 1300. However, the coordinates indicating the locations of the top left samples 1330a, 1330b, and 1330c may include coordinates indicating absolute locations in the picture, or may use a coordinate (dxb, dyb) indicating a relative location of the top left sample 1330b of the middle coding unit 1320b and a coordinate (dxc, dyc) indicating a relative location of the top left sample 1330c of the lower coding unit 1320c with reference to the location of the top left sample 1330a of the upper coding unit 1320a. A method of determining a coding unit at a predetermined location by using a coordinate of a sample included in the coding unit, as information indicating a location of the sample, is not limited to the above-described method, and may include various arithmetic methods capable of using the coordinate of the sample.

According to an embodiment, the image decoding apparatus 100 may partition the current coding unit 1300 into a plurality of coding units 1320a, 1320b, and 1320c, and select one of the coding units 1320a, 1320b, and 1320c based on a predetermined criterion. For example, the image decoding apparatus 100 may select the coding unit 1320b, which has a size different from that of the others, from among the coding units 1320a, 1320b, and 1320c.

According to an embodiment, the image decoding apparatus 100 may determine the widths or heights of the coding units 1320a, 1320b, and 1320c by using the coordinate (xa, ya) indicating the location of the top left sample 1330a of the upper coding unit 1320a, the coordinate (xb, yb) indicating the location of the top left sample 1330b of the middle coding unit 1320b, and the coordinate (xc, yc) indicating the location of the top left sample 1330c of the lower coding unit 1320c. The image decoding apparatus 100 may determine the sizes of the coding units 1320a, 1320b, and 1320c by using the coordinates (xa, ya), (xb, yb), and (xc, yc) indicating the locations of the coding units 1320a, 1320b, and 1320c.

According to an embodiment, the image decoding apparatus 100 may determine the width of the upper coding unit 1320a to be xb-xa and determine the height thereof to be yb-ya. According to an embodiment, the image decoding apparatus 100 may determine the width of the middle coding unit 1320b to be xc-xb and determine the height thereof to be yc-yb. According to an embodiment, the image decoding apparatus 100 may determine the width or height of the lower coding unit 1320c by using the width or height of the current coding unit 1300 or the widths or heights of the upper and middle coding units 1320a and 1320b. The image decoding apparatus 100 may determine a coding unit, which has a size different from that of the others, based on the determined widths and heights of the coding units 1320a to 1320c. Referring to FIG. 13, the image decoding apparatus 100 may determine the middle coding unit 1320b, which has a size different from the size of the upper and lower coding units 1320a and 1320c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a predetermined location from among an odd number of coding units determined by partitioning the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and put a restriction on the coding unit.

According to an embodiment, the image decoding apparatus 100 may use information indicating locations of an even number of coding units, to determine the coding unit at the predetermined location from among the even number of coding units. The image decoding apparatus 100 may determine an even number of coding units by partitioning the current coding unit, and determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 13, and thus detailed descriptions thereof will not be provided herein.

According to an embodiment, when a non-square current coding unit is partitioned into a plurality of coding units, predetermined information about a coding unit at a predetermined location may be used in a partitioning operation to determine the coding unit at the predetermined location from among the plurality of coding units. For example, the image decoding apparatus 100 may use at least one of block shape information and partition shape information, which is stored in a sample included in a coding unit at a center location, in a partitioning operation to determine the coding unit at the center location from among the plurality of coding units determined by partitioning the current coding unit.

Referring to FIG. 13, the image decoding apparatus 100 may partition the current coding unit 1300 into a plurality of coding units 1320a, 1320b, and 1320c based on at least one of the block shape information and the partition shape information, and determine a coding unit 1320b at a center location from among the plurality of the coding units 1320a, 1320b, and 1320c. Furthermore, the image decoding apparatus 100 may determine the coding unit 1320b at the center location, in consideration of a location from which at least one of the block shape information and the partition shape information is obtained. That is, at least one of the block shape information and the partition shape information of the current coding unit 1300 may be obtained from the sample 1340 at a center location of the current coding unit 1300 and, when the current coding unit 1300 is partitioned into the plurality of coding units 1320a, 1320b, and 1320c based on at least one of the block shape information and the partition shape information, the coding unit 1320b including the sample 1340 may be determined as the coding unit at the center location. However, information used to determine the coding unit at the center location is not limited to at least one of the block shape information and the partition shape information, and various types of information may be used to determine the coding unit at the center location.

According to an embodiment, predetermined information for identifying the coding unit at the predetermined location may be obtained from a predetermined sample included in a coding unit to be determined. Referring to FIG. 13, the image decoding apparatus 100 may use at least one of the block shape information and the partition shape information, which is obtained from a sample at a predetermined location in the current coding unit 1300 (e.g., a sample at a center location of the current coding unit 1300) to determine a coding unit at a predetermined location from among the plurality of the coding units 1320a, 1320b, and 1320c determined by partitioning the current coding unit 1300 (e.g., a coding unit at a center location from among a plurality of partitioned coding units). That is, the image decoding apparatus 100 may determine the sample at the predetermined location by considering a block shape of the current coding unit 1300, determine the coding unit 1320b including a sample, from which predetermined information (e.g., at least one of the block shape information and the partition shape information) may be obtained, from among the plurality of coding units 1320a, 1320b, and 1320c determined by partitioning the current coding unit 1300, and put a predetermined restriction on the coding unit 1320b. Referring to FIG. 13, according to an embodiment, the image decoding apparatus 100 may determine the sample 1340 at the center location of the current coding unit 1300 as the sample from which the predetermined information may be obtained, and put a predetermined restriction on the coding unit 1320b including the sample 1340, in a decoding operation. However, the location of the sample from which the predetermined information may be obtained is not limited to the above-described location, and may include arbitrary locations of samples included in the coding unit 1320b to be determined for a restriction.

According to an embodiment, the location of the sample from which the predetermined information may be obtained may be determined based on the shape of the current coding unit 1300. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the predetermined information may be obtained.

According to an embodiment, when the current coding unit is partitioned into a plurality of coding units, the image decoding apparatus 100 may use at least one of the block shape information and the partition shape information to determine a coding unit at a predetermined location from among the plurality of coding units. According to an embodiment, the image decoding apparatus 100 may obtain at least one of the block shape information and the partition shape information from a sample at a predetermined location in a coding unit, and partition the plurality of coding units, which are generated by partitioning the current coding unit, by using at least one of the partition shape information and the block shape information, which is obtained from the sample of the predetermined location in each of the plurality of coding units. That is, a coding unit may be recursively partitioned based on at least one of the block shape information and the partition shape information, which is obtained from the sample of the predetermined location in each coding unit. An operation of recursively partitioning a coding unit has been described above in relation to FIG. 12, and thus detailed descriptions thereof will not be provided herein.

According to an embodiment, the image decoding apparatus 100 may determine one or more coding units by partitioning the current coding unit, and determine an order of decoding the one or more coding units, based on a predetermined block (e.g., the current coding unit).

Figure 14:
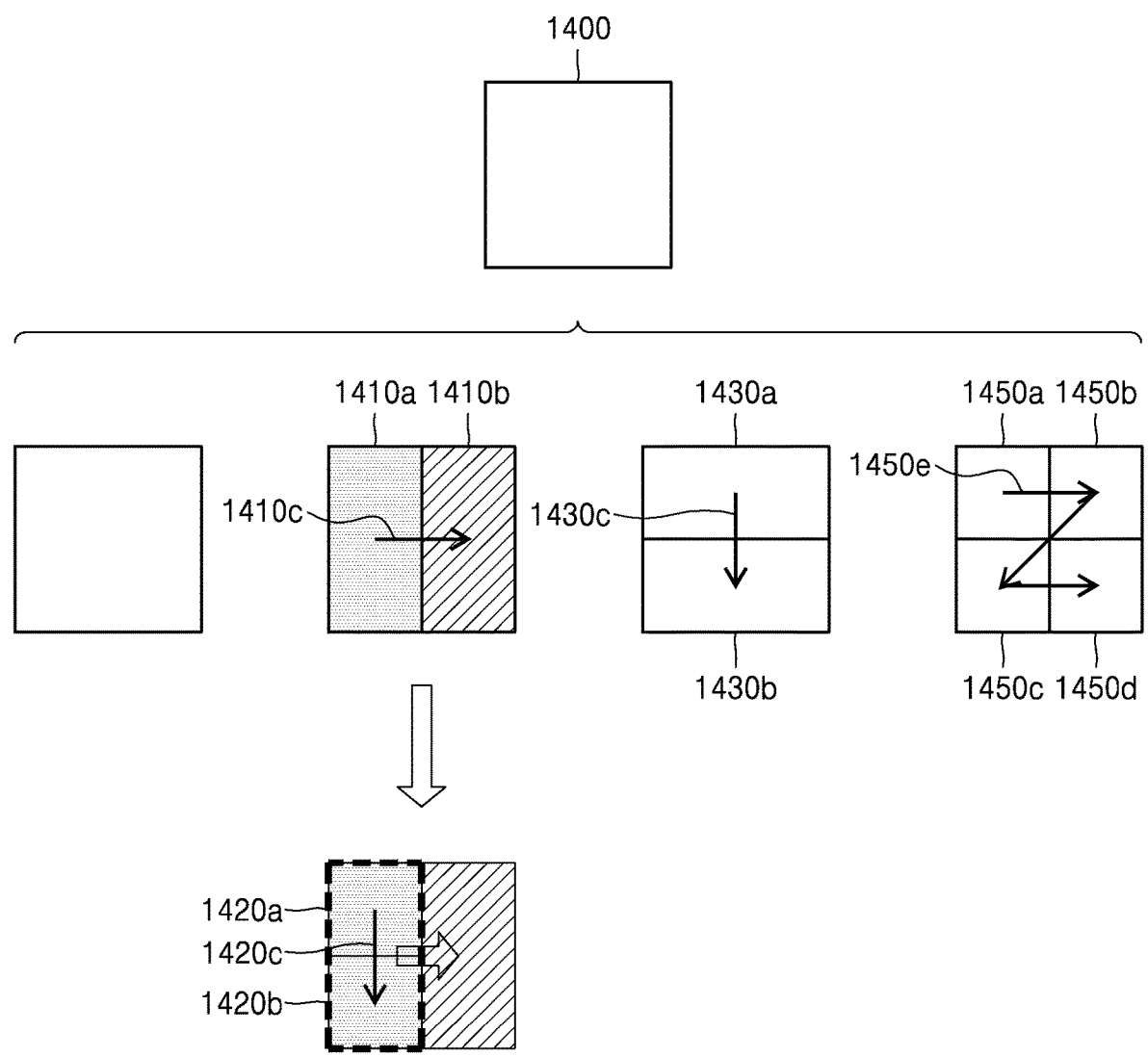
FIG. 14 illustrates a processing order of a plurality of coding units, the plurality of coding units being determined by partitioning a current coding unit, according to an embodiment.

FIG. 14 illustrates a processing order of a plurality of coding units when the image decoding apparatus 100 determines the plurality of coding units by partitioning a current coding unit, according to an embodiment.

According to an embodiment, the image decoding apparatus 100 may determine second coding units 1410a and 1410b by partitioning a first coding unit 1400 in a vertical direction, determine second coding units 1430a and 1430b by partitioning the first coding unit 1400 in a horizontal direction, or determine second coding units 1450a to 1450d by partitioning the first coding unit 1400 in vertical and horizontal directions, based on block shape information and partition shape information.

Referring to FIG. 14, the image decoding apparatus 100 may determine to process the second coding units 1410a and 1410b, which are determined by partitioning the first coding unit 1400 in a vertical direction, in a horizontal direction order 1410c. The image decoding apparatus 100 may determine to process the second coding units 1430a and 1430b, which are determined by partitioning the first coding unit 1400 in a horizontal direction, in a vertical direction order 1430c. The image decoding apparatus 100 may determine to process the second coding units 1450a to 1450d, which are determined by partitioning the first coding unit 1400 in vertical and horizontal directions, in a predetermined order for processing coding units in a row and then processing coding units in a next row (e.g., in a raster scan order or Z-scan order 1450e).

According to an embodiment, the image decoding apparatus 100 may recursively partition coding units. Referring to FIG. 14, the image decoding apparatus 100 may determine a plurality of coding units 1410a, 1410b, 1430a, 1430b, 1450a, 1450b, 1450c, and 1450d by partitioning the first coding unit 1400, and recursively partition each of the determined plurality of coding units 1410a, 1410b, 1430a, 1430b, 1450a, 1450b, 1450c, and 1450d. A partitioning method of the plurality of coding units 1410a, 1410b, 1430a, 1430b, 1450a, 1450b, 1450c, and 1450d may correspond to a partitioning method of the first coding unit 1400. As such, each of the plurality of coding units 1410a, 1410b, 1430a, 1430b, 1450a, 1450b, 1450c, and 1450d may be independently partitioned into a plurality of coding units. Referring to FIG. 14, the image decoding apparatus 100 may determine the second coding units 1410a and 1410b by partitioning the first coding unit 1400 in a vertical direction, and determine to independently partition or not to partition each of the second coding units 1410a and 1410b.

According to an embodiment, the image decoding apparatus 100 may determine third coding units 1420a and 1420b by partitioning the left second coding unit 1410a in a horizontal direction, and may not partition the right second coding unit 1410b.

According to an embodiment, a processing order of coding units may be determined based on an operation of partitioning a coding unit. In other words, a processing order of partitioned coding units may be determined based on a processing order of coding units immediately before being partitioned. The image decoding apparatus 100 may determine a processing order of the third coding units 1420a and 1420b determined by partitioning the left second coding unit 1410a, independently of the right second coding unit 1410b. Since the third coding units 1420a and 1420b are determined by partitioning the left second coding unit 1410a in a horizontal direction, the third coding units 1420a and 1420b may be processed in a vertical direction order 1420c. Since the left and right second coding units 1410a and 1410b are processed in the horizontal direction order 1410c, the right second coding unit 1410b may be processed after the third coding units 1420a and 1420b included in the left second coding unit 1410a are processed in the vertical direction order 1420c. An operation of determining a processing order of coding units based on a coding unit before being partitioned is not limited to the above-described example, and various methods may be used to independently process coding units, which are partitioned and determined to various shapes, in a predetermined order.

Figure 15:
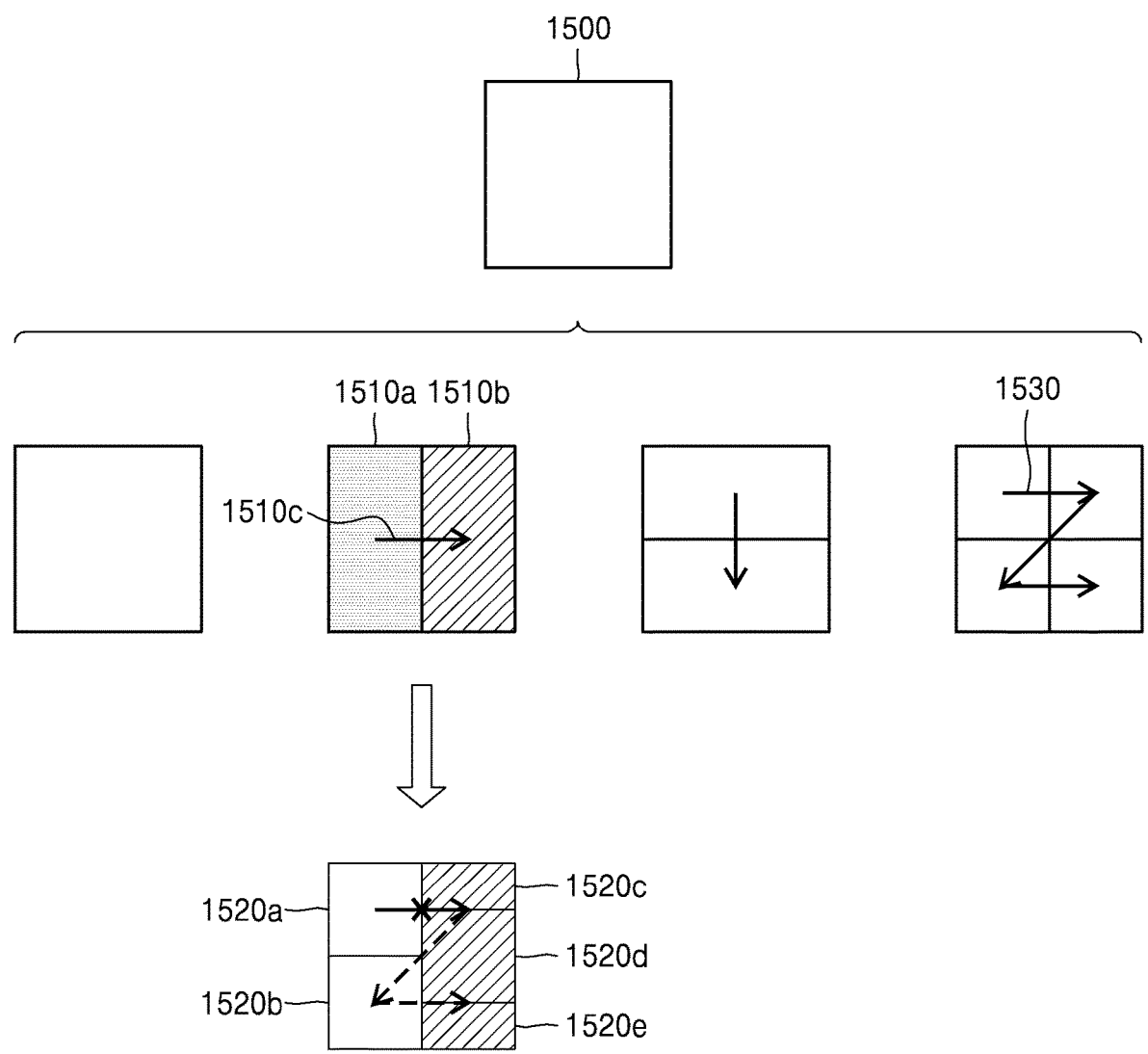
FIG. 15 illustrates an operation of determining that a current coding unit is partitioned into an odd number of coding units, when the coding units are not processable in a predetermined order, according to an embodiment.

FIG. 15 illustrates an operation, performed by the image decoding apparatus 100, of determining that a current coding unit is partitioned into an odd number of coding units, when the coding units are not processable in a predetermined order, according to an embodiment.

According to an embodiment, the image decoding apparatus 100 may determine whether the current coding unit is partitioned into an odd number of coding units, based on obtained block shape information and partition shape information. Referring to FIG. 15, a square first coding unit 1500 may be partitioned into non-square second coding units 1510a and 1510b, and the second coding units 1510a and 1510b may be independently partitioned into third coding units 1520a and 1520b, and 1520c to 1520e. According to an embodiment, the image decoding apparatus 100 may determine a plurality of third coding units 1520a and 1520b by partitioning the left second coding unit 1510a in a horizontal direction, and partition the right second coding unit 1510b into an odd number of third coding units 1520c to 1520e.

According to an embodiment, the image decoding apparatus 100 may determine whether any coding unit is partitioned into an odd number of coding units, by deciding whether the third coding units 1520a and 1520b, and 1520c to 1520e are processable in a predetermined order. Referring to FIG. 15, the image decoding apparatus 100 may determine the third coding units 1520a and 1520b, and 1520c to 1520e by recursively partitioning the first coding unit 1500. The image decoding apparatus 100 may determine whether any of the first coding unit 1500, the second coding units 1510a and 1510b, and the third coding units 1520a and 1520b, and 1520c to 1520e is partitioned into an odd number of coding units, based on at least one of the block shape information and the partition shape information. For example, the right second coding unit 1510b may be partitioned into an odd number of third coding units 1520c to 1520e. A processing order of a plurality of coding units included in the first coding unit 1500 may be a predetermined order (e.g., a Z-scan order 1530), and the image decoding apparatus 100 may decide whether the third coding units 1520*c* to 1520*e*, which are determined by partitioning the right second coding unit 1510*b* into an odd number of coding units, satisfy a condition for processing in the predetermined order.

According to an embodiment, the image decoding apparatus 100 may determine whether the third coding units 1520*a* and 1520*b*, and 1520*c* to 1520*e* included in the first coding unit 1500 satisfy the condition for processing in the predetermined order, and the condition relates to whether at least one of a width and height of the second coding units 1510*a* and 1510*b* is divided in half along a boundary of the third coding units 1520*a* and 1520*b*, and 1520*c* to 1520*e*. For example, the third coding units 1520*a* and 1520*b* determined by dividing the height of the non-square left second coding unit 1510*a* in half satisfy the condition. However, since boundaries of the third coding units 1520*c* to 1520*e* determined by partitioning the right second coding unit 1510*b* into three coding units do not divide the width or height of the right second coding unit 1510*b* in half, it may be determined that the third coding units 1520*c* to 1520*e* do not satisfy the condition. When the condition is not satisfied as described above, the image decoding apparatus 100 may decide disconnection of a scan order, and determine that the right second coding unit 1510*b* is partitioned into an odd number of coding units, based on the result of decision. According to an embodiment, when a coding unit is partitioned into an odd number of coding units, the image decoding apparatus 100 may put a predetermined restriction on a coding unit of a predetermined location among the partitioned coding units. The restriction or the predetermined location has been described above in relation to various embodiments, and thus a detailed description thereof will not be provided herein.

Figure 16:
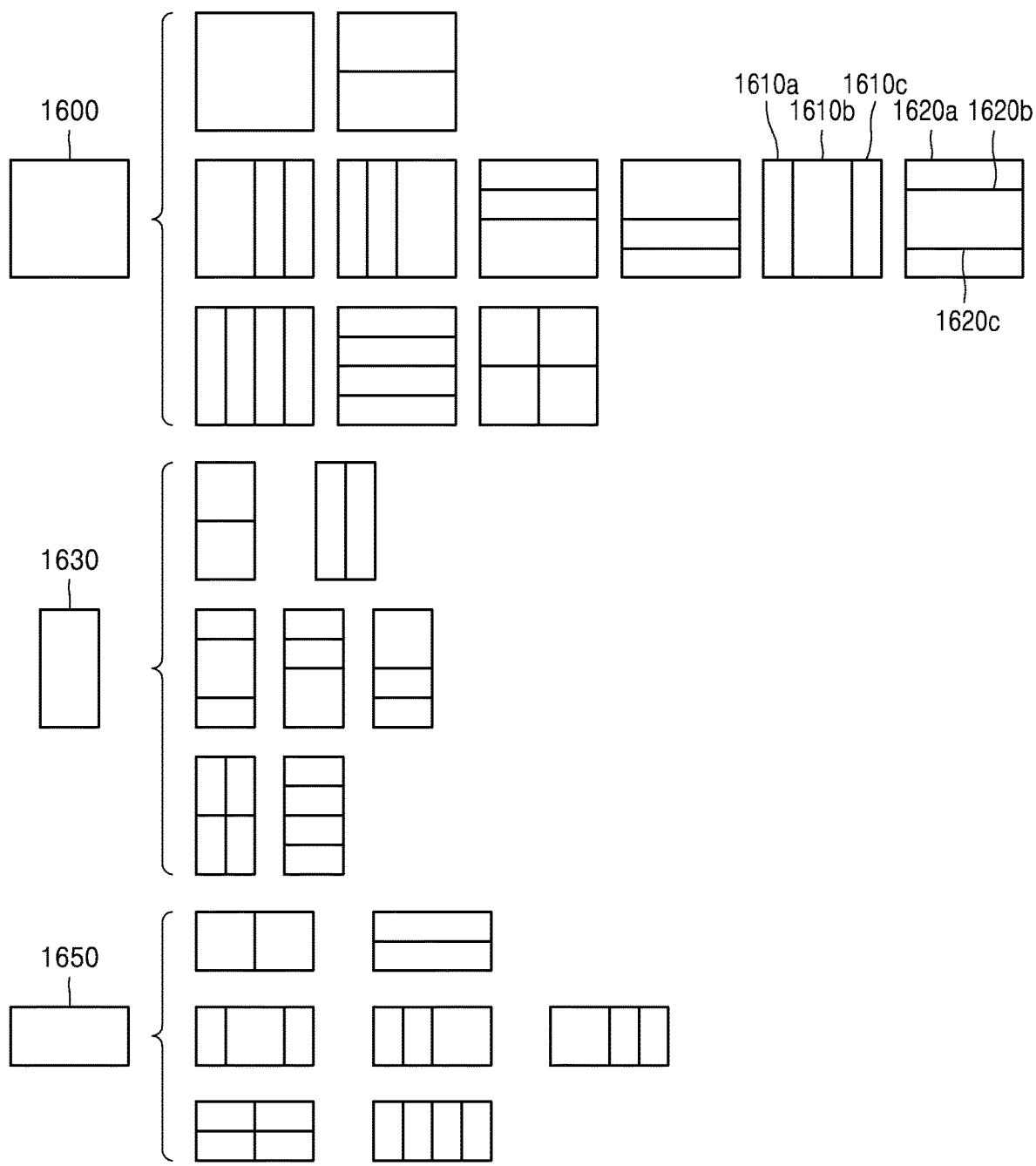
FIG. 16 illustrates an operation of determining one or more coding units by partitioning a first coding unit, according to an embodiment.

FIG. 16 illustrates an operation, performed by the image decoding apparatus 100, of determining one or more coding units by partitioning a first coding unit 1600, according to an embodiment. According to an embodiment, the image decoding apparatus 100 may partition the first coding unit 1600, based on at least one of block shape information and partition shape information, which is obtained by the bitstream obtainer 110. The square first coding unit 1600 may be partitioned into four square coding units or into a plurality of non-square coding units. For example, referring to FIG. 16, when the block shape information indicates that the first coding unit 1600 has a square shape and the partition shape information indicates to partition the first coding unit 1600 into non-square coding units, the image decoding apparatus 100 may partition the first coding unit 1600 into a plurality of non-square coding units. In more detail, when the partition shape information indicates to determine an odd number of coding units by partitioning the first coding unit 1600 in a horizontal direction or a vertical direction, the image decoding apparatus 100 may partition the square first coding unit 1600 into an odd number of coding units, e.g., second coding units 1610*a*, 1610*b*, and 1610*c* determined by partitioning the square first coding unit 1600 in a vertical direction or second coding units 1620*a*, 1620*b*, and 1620*c* determined by partitioning the square first coding unit 1600 in a horizontal direction.

According to an embodiment, the image decoding apparatus 100 may determine whether the second coding units 1610*a*, 1610*b*, 1610*c*, 1620*a*, 1620*b*, and 1620*c* included in the first coding unit 1600 satisfy a condition for processing in a predetermined order, and the condition relates to whether at least one of a width and height of the first coding unit 1600 is divided in half along a boundary of the second coding units 1610*a*, 1610*b*, 1610*c*, 1620*a*, 1620*b*, and 1620*c*. Referring to FIG. 16, since boundaries of the second coding units 1610*a*, 1610*b*, and 1610*c* determined by partitioning the square first coding unit 1600 in a vertical direction do not divide the width of the first coding unit 1600 in half, it may be determined that the first coding unit 1600 does not satisfy the condition for processing in the predetermined order. In addition, since boundaries of the second coding units 1620*a*, 1620*b*, and 1620*c* determined by partitioning the square first coding unit 1600 in a horizontal direction do not divide the width of the first coding unit 1600 in half, it may be determined that the first coding unit 1600 does not satisfy the condition for processing in the predetermined order. When the condition is not satisfied as described above, the image decoding apparatus 100 may decide disconnection of a scan order, and determine that the first coding unit 1600 is partitioned into an odd number of coding units, based on the result of decision. According to an embodiment, when a coding unit is partitioned into an odd number of coding units, the image decoding apparatus 100 may put a predetermined restriction on a coding unit at a predetermined location from among the partitioned coding units. The restriction or the predetermined location has been described above in relation to various embodiments, and thus detailed descriptions thereof will not be provided herein.

According to an embodiment, the image decoding apparatus 100 may determine various-shaped coding units by partitioning a first coding unit.

Referring to FIG. 16, the image decoding apparatus 100 may partition the square first coding unit 1600 or a non-square first coding unit 1630 or 1650 into various-shaped coding units.

Figure 17:
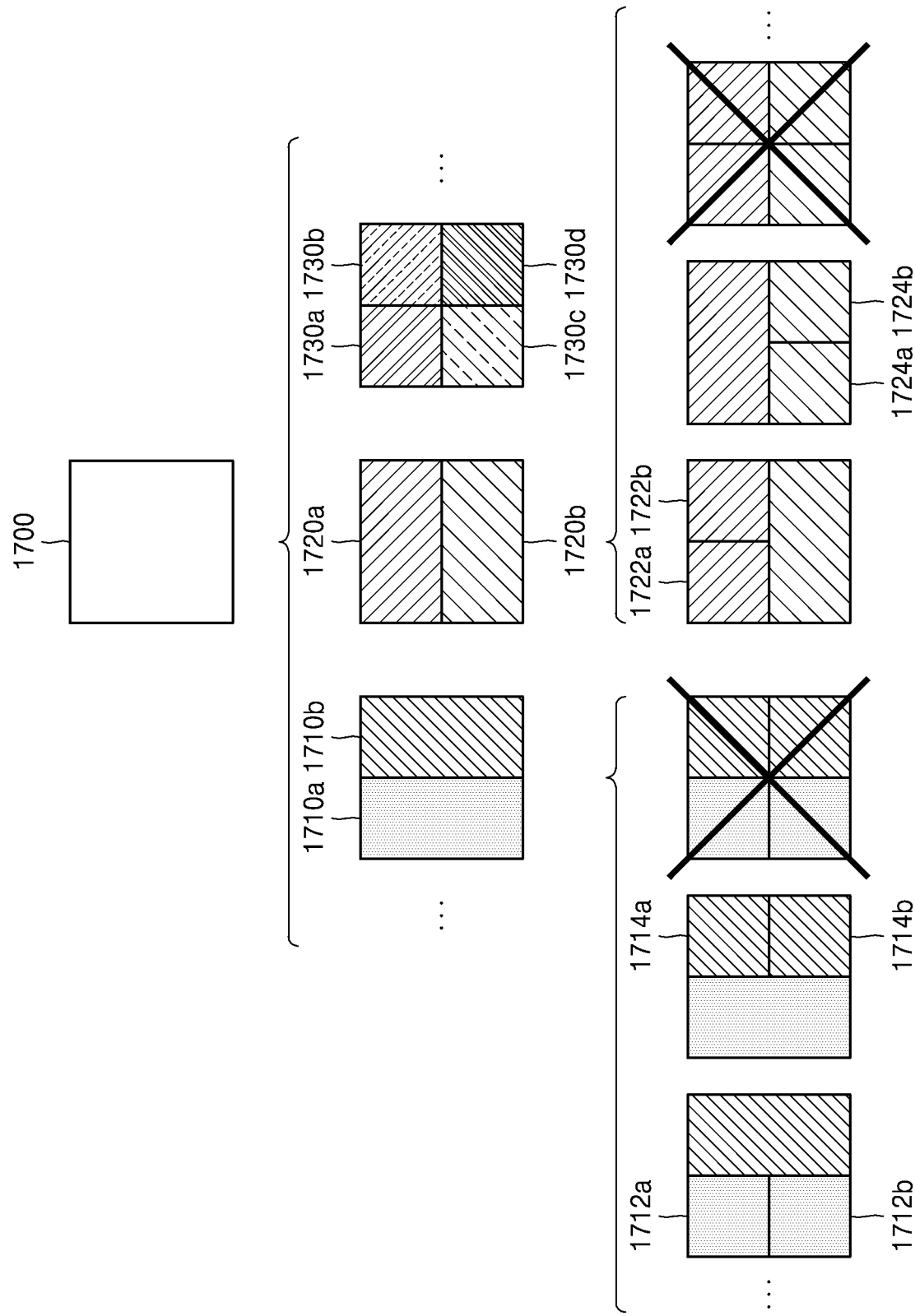
FIG. 17 illustrates that, in a case where non-square second coding units determined by partitioning a first coding unit satisfy a predetermined condition, partitioning methods of determining the non-square second coding units are restricted, according to an embodiment.

FIG. 17 illustrates that a shape into which a second coding unit is splittable by the image decoding apparatus 100 is restricted when the second coding unit having a non-square shape, which is determined by partitioning a first coding unit 1700, satisfies a predetermined condition, according to an embodiment.

According to an embodiment, the image decoding apparatus 100 may determine to partition the square first coding unit 1700 into non-square second coding units 1710*a*, 1710*b*, 1720*a*, and 1720*b*, based on at least one of block shape information and partition shape information, which is obtained by the bitstream obtainer 110. The second coding units 1710*a*, 1710*b*, 1720*a*, and 1720*b* may be independently partitioned. As such, the image decoding apparatus 100 may determine to or not to partition the first coding unit 1700 into a plurality of coding units, based on at least one of the block shape information and the partition shape information of each of the second coding units 1710*a*, 1710*b*, 1720*a*, and 1720*b*. According to an embodiment, the image decoding apparatus 100 may determine third coding units 1712*a* and 1712*b* by partitioning the non-square left second coding unit 1710*a*, which is determined by partitioning the first coding unit 1700 in a vertical direction, in a horizontal direction. However, when the left second coding unit 1710*a* is partitioned in a horizontal direction, the image decoding apparatus 100 may restrict the right second coding unit 1710*b* not to be partitioned in a horizontal direction in which the left second coding unit 1710*a* is partitioned. When third coding units 1714*a* and 1714*b* are determined by also partitioning the right second coding unit 1710*b* in a horizontal direction, since the left and right second coding units 1710*a* and 1710*b* are independently partitioned in a horizontal direction, the third coding units 1712a, 1712b, 1714a, and 1714b may be determined. However, this case serves equally as a case in which the image decoding apparatus 100 partitions the first coding unit 1700 into four square second coding units 1730a, 1730b, 1730c, and 1730d, based on at least one of the block shape information and the partition shape information, and may be inefficient in terms of image decoding.

According to an embodiment, the image decoding apparatus 100 may determine third coding units 1722a, 1722b, 1724a, and 1724b by partitioning the non-square second coding unit 1720a or 1720b, which is determined by partitioning the first coding unit 1700 in a horizontal direction, in a vertical direction. However, when a second coding unit (e.g., the upper second coding unit 1720a) is partitioned in a vertical direction, due to the above-described reason, the image decoding apparatus 100 may restrict the other second coding unit (e.g., the lower second coding unit 1720b) not to be partitioned in a vertical direction in which the upper second coding unit 1720a is partitioned.

Figure 18:
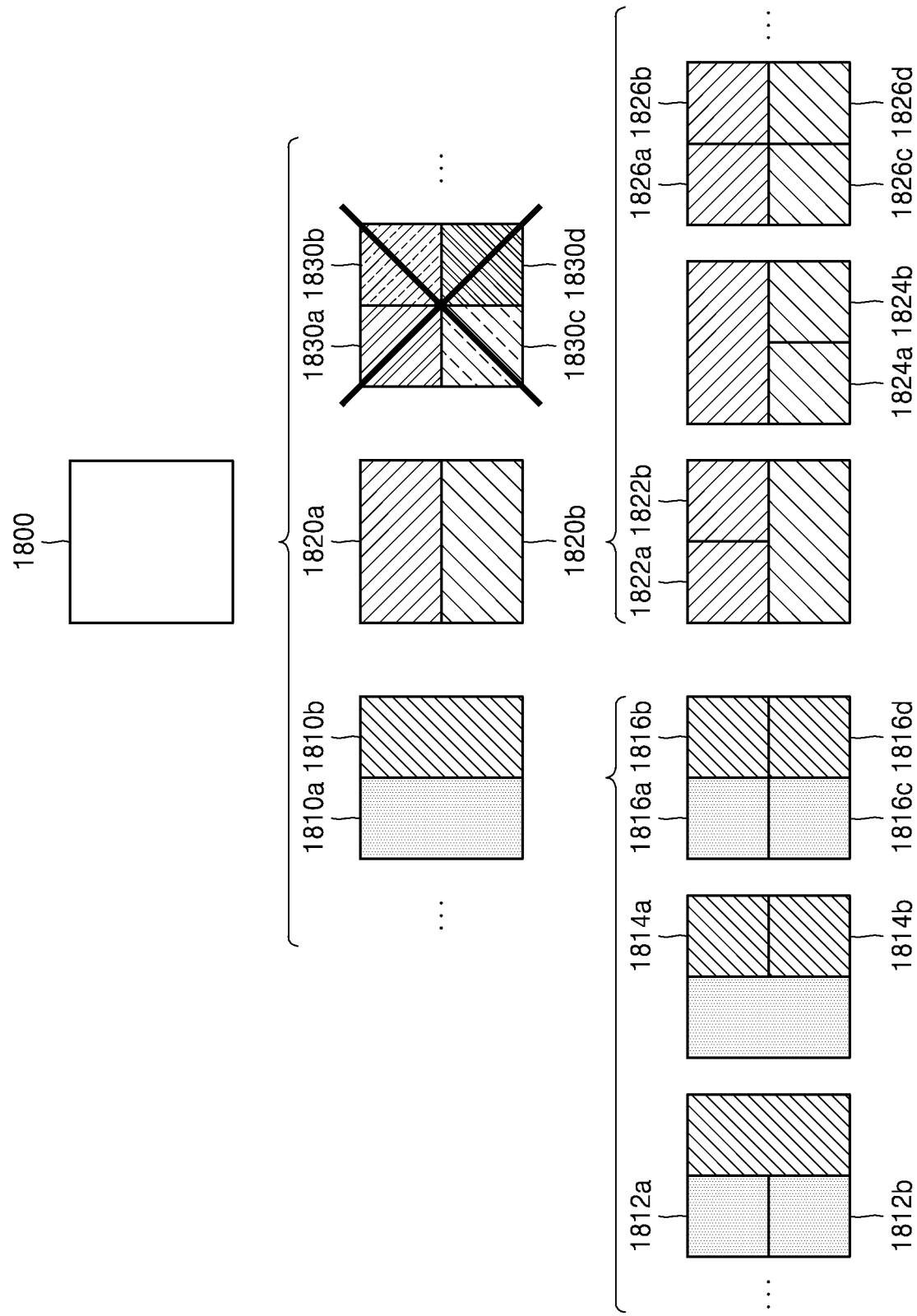
FIG. 18 illustrates an operation of partitioning a square coding unit when partition shape information indicates not to partition the square coding unit into four square coding units, according to an embodiment.

FIG. 18 illustrates an operation, performed by the image decoding apparatus 100, of partitioning a square coding unit when partition shape information indicates not to partition the square coding unit into four square coding units, according to an embodiment.

According to an embodiment, the image decoding apparatus 100 may determine second coding units 1810a, 1810b, 1820a, 1820b, etc. by partitioning a first coding unit 1800, based on at least one of block shape information and partition shape information. The partition shape information may include information about various methods of partitioning a coding unit but, the information about various partitioning methods may not include information for partitioning a coding unit into four square coding units. According to this partition shape information, the image decoding apparatus 100 may not partition the first square coding unit 1800 into four square second coding units 1830a, 1830b, 1830c, and 1830d. The image decoding apparatus 100 may determine the non-square second coding units 1810a, 1810b, 1820a, 1820b, etc., based on the partition shape information.

According to an embodiment, the image decoding apparatus 100 may independently partition the non-square second coding units 1810a, 1810b, 1820a, 1820b, etc. Each of the second coding units 1810a, 1810b, 1820a, 1820b, etc. may be recursively partitioned in a predetermined order, and this may correspond to a partitioning method of the first coding unit 1800, based on at least one of the block shape information and the partition shape information.

For example, the image decoding apparatus 100 may determine square third coding units 1812a and 1812b by partitioning the left second coding unit 1810a in a horizontal direction, and determine square third coding units 1814a and 1814b by partitioning the right second coding unit 1810b in a horizontal direction. Furthermore, the image decoding apparatus 100 may determine square third coding units 1816a to 1816d by partitioning both of the left and right second coding units 1810a and 1810b in a horizontal direction. In this case, coding units having the same shape as the four square second coding units 1830a, 1830b, 1830c, and 1830d partitioned from the first coding unit 1800 may be determined.

As another example, the image decoding apparatus 100 may determine square third coding units 1822a and 1822b by partitioning the upper second coding unit 1820a in a vertical direction, and determine square third coding units 1824a and 1824b by partitioning the lower second coding unit 1820b in a vertical direction. Furthermore, the image decoding apparatus 100 may determine square third coding units 1822a, 1822b, 1824a, and 1824b by partitioning both the upper and lower second coding units 1820a and 1820b in a vertical direction. In this case, coding units having the same shape as the four square second coding units 1830a, 1830b, 1830c, and 1830d partitioned from the first coding unit 1800 may be determined.

Figure 19:
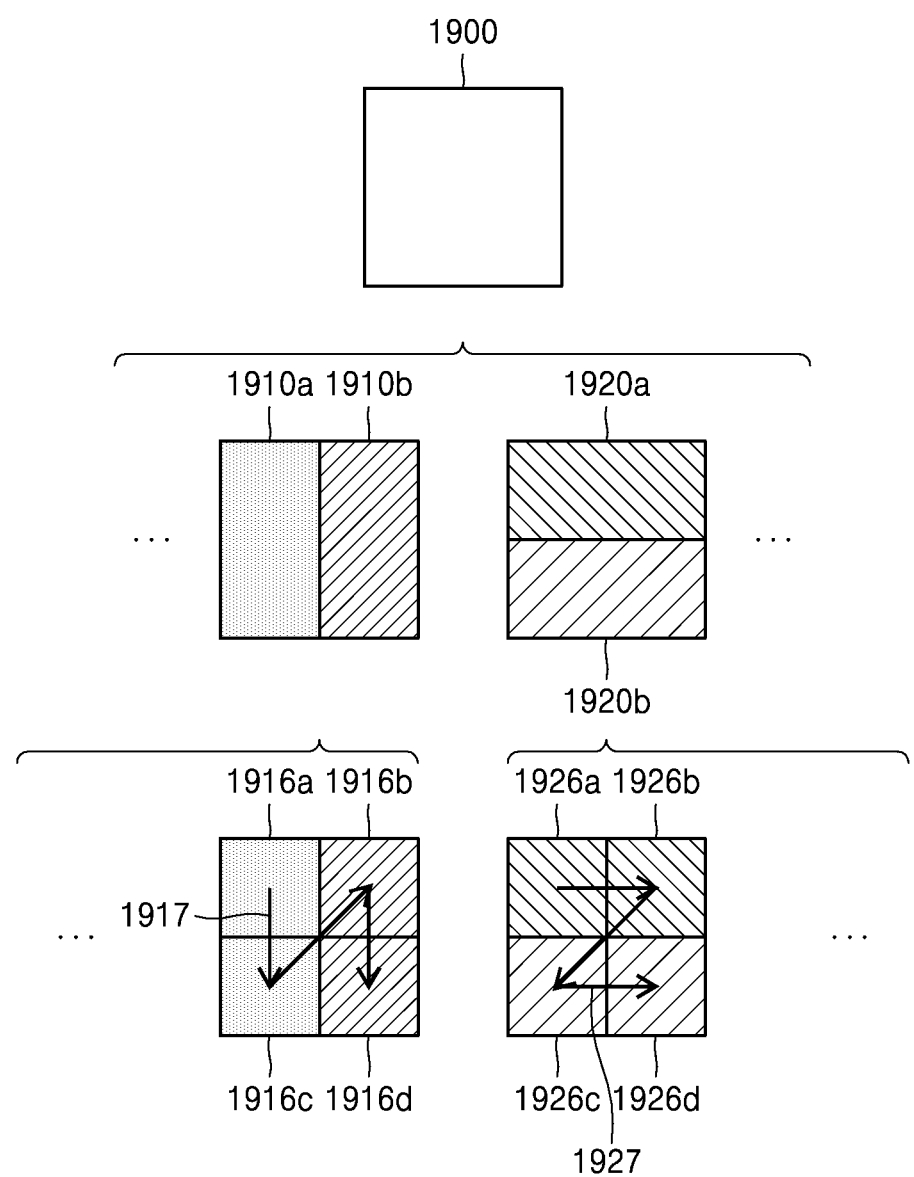
FIG. 19 illustrates that a processing order of a plurality of coding units is variable depending on an operation of partitioning a coding unit, according to an embodiment.

FIG. 19 illustrates that a processing order of a plurality of coding units is variable depending on an operation of partitioning a coding unit, according to an embodiment.

According to an embodiment, the image decoding apparatus 100 may partition a first coding unit 1900, based on block shape information and partition shape information. When the block shape information indicates a square shape and the partition shape information indicates to partition the first coding unit 1900 in at least one of horizontal and vertical directions, the image decoding apparatus 100 may determine second coding units 1910a, 1910b, 1920a, 1920b, 1930a, 1930b, 1930c, and 1930d by partitioning the first coding unit 1900. Referring to FIG. 19, the non-square second coding units 1910a, 1910b, 1920a, and 1920b determined by partitioning the first coding unit 1900 in only a horizontal direction or vertical direction may be independently partitioned based on the block shape information and the partition shape information of each coding unit. For example, the image decoding apparatus 100 may determine third coding units 1916a, 1916b, 1916c, and 1916d by partitioning the second coding units 1910a and 1910b, which are generated by partitioning the first coding unit 1900 in a vertical direction, in a horizontal direction, and determine third coding units 1926a, 1926b, 1926c, and 1926d by partitioning the second coding units 1920a and 1920b, which are generated by partitioning the first coding unit 1900 in a horizontal direction, in a horizontal direction. An operation of partitioning the second coding units 1910a, 1910b, 1920a, and 1920b has been described above in relation to FIG. 17, and thus detailed descriptions thereof will not be provided herein.

According to an embodiment, the image decoding apparatus 100 may process coding units in a predetermined order. An operation of processing coding units in a predetermined order has been described above in relation to FIG. 14, and thus detailed descriptions thereof will not be provided herein. Referring to FIG. 19, the image decoding apparatus 100 may determine the four square third coding units 1916a, 1916b, 1916c, 1916d, 1926a, 1926b, 1926c, and 1926d by partitioning the square first coding unit 1900. According to an embodiment, the image decoding apparatus 100 may determine a processing order of the third coding units 1916a, 1916b, 1916c, 1916d, 1926a, 1926b, 1926c, and 1926d based on a partitioning method of the first coding unit 1900.

According to an embodiment, the image decoding apparatus 100 may determine the third coding units 1916a, 1916b, 1916c, and 1916d by partitioning the second coding units 1910a and 1910b generated by partitioning the first coding unit 1900 in a vertical direction, in a horizontal direction, and process the third coding units 1916a, 1916b, 1916c, and 1916d in a processing order 1917 for initially processing the third coding units 1916a and 1916c, which are included in the left second coding unit 1910a, in a vertical direction and then processing the third coding unit 1916b and 1916d, which are included in the right second coding unit 1910b, in a vertical direction.

According to an embodiment, the image decoding apparatus 100 may determine the third coding units 1926a, 1926b, 1926c, and 1926d by partitioning the second coding units 1920a and 1920b generated by partitioning the first coding unit 1900 in a horizontal direction, in a vertical direction, and process the third coding units 1926*a*, 1926*b*, 1926*c*, and 1926*d* in a processing order 1927 for initially processing the third coding units 1926*a* and 1926*b*, which are included in the upper second coding unit 1920*a*, in a horizontal direction and then processing the third coding unit 1926*c* and 1926*d*, which are included in the lower second coding unit 1920*b*, in a horizontal direction.

Referring to FIG. 19, the square third coding units 1916*a*, 1916*b*, 1916*c*, 1916*d*, 1926*a*, 1926*b*, 1926*c*, and 1926*d* may be determined by partitioning the second coding units 1910*a*, 1910*b*, 1920*a*, and 1920*b*. Although the second coding units 1910*a* and 1910*b* are determined by partitioning the first coding unit 1900 in a vertical direction differently from the second coding units 1920*a* and 1920*b* which are determined by partitioning the first coding unit 1900 in a horizontal direction, the third coding units 1916*a*, 1916*b*, 1916*c*, 1916*d*, 1926*a*, 1926*b*, 1926*c*, and 1926*d* partitioned therefrom eventually show same-shaped coding units partitioned from the first coding unit 1900. As such, by recursively partitioning a coding unit in different manners based on at least one of the block shape information and the partition shape information, the image decoding apparatus 100 may process a plurality of coding units in different orders even when the coding units are eventually determined to the same shape.

FIG. 20 illustrates an operation of determining a depth of a coding unit as the shape and size of the coding unit varies when a plurality of coding units are determined by recursively partitioning the coding unit, according to an embodiment.

According to an embodiment, the image decoding apparatus 100 may determine the depth of the coding unit based on a predetermined criterion. For example, the predetermined criterion may be the length of a long side of the coding unit. When the length of a long side of a coding unit before being partitioned is 2n times (n>0) the length of a long side of a partitioned current coding unit, the image decoding apparatus 100 may determine that a depth of the current coding unit is increased from a depth of the coding unit before being partitioned, by n. In the following description, a coding unit having an increased depth is expressed as a coding unit of a deeper depth.

Referring to FIG. 20, according to an embodiment, the image decoding apparatus 100 may determine a second coding unit 2002 and a third coding unit 2004 of deeper depths by partitioning a square first coding unit 2000 based on block shape information indicating a square shape (for example, the block shape information may be expressed as '0: SQUARE'). Assuming that the size of the square first coding unit 2000 is 2N×2N, the second coding unit 2002 determined by reducing a width and height of the first coding unit 2000 to ½1 may have a size of N×N. Furthermore, the third coding unit 2004 determined by reducing a width and height of the second coding unit 2002 to ½ may have a size of N/2×N/2. In this case, a width and height of the third coding unit 2004 are ½2 times those of the first coding unit 2000. When a depth of the first coding unit 2000 is D, a depth of the second coding unit 2002, the width and height of which are ½1 times those of the first coding unit 2000, may be D+1, and a depth of the third coding unit 2004, the width and height of which are ½2 times those of the first coding unit 2000, may be D+2.

According to an embodiment, the image decoding apparatus 100 may determine a second coding unit 2012 or 2022 and a third coding unit 2014 or 2024 of deeper depths by partitioning a non-square first coding unit 2010 or 2020 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 2002, 2012, or 2022 by dividing at least one of a width and height of the first coding unit 2010 having a size of N×2N. That is, the image decoding apparatus 100 may determine the second coding unit 2002 having a size of N×N or the second coding unit 2022 having a size of N×N/2 by partitioning the first coding unit 2010 in a horizontal direction, or determine the second coding unit 2012 having a size of N/2×N by partitioning the first coding unit 2010 in horizontal and vertical directions.

According to an embodiment, the image decoding apparatus 100 may determine the second coding unit 2002, 2012, or 2022 by dividing at least one of a width and height of the first coding unit 2020 having a size of 2N×N. That is, the image decoding apparatus 100 may determine the second coding unit 2002 having a size of N×N or the second coding unit 2012 having a size of N/2×N by partitioning the first coding unit 2020 in a vertical direction, or determine the second coding unit 2022 having a size of N×N/2 by partitioning the first coding unit 2020 in horizontal and vertical directions.

According to an embodiment, the image decoding apparatus 100 may determine a third coding unit 2004, 2014, or 2024 by dividing at least one of a width and height of the second coding unit 2002 having a size of N×N. That is, the image decoding apparatus 100 may determine the third coding unit 2004 having a size of N/2×N/2, the third coding unit 2014 having a size of N/22×N/2, or the third coding unit 2024 having a size of N/2×N/22 by partitioning the second coding unit 2002 in vertical and horizontal directions.

According to an embodiment, the image decoding apparatus 100 may determine the third coding unit 2004, 2014, or 2024 by dividing at least one of a width and height of the second coding unit 2012 having a size of N/2×N. That is, the image decoding apparatus 100 may determine the third coding unit 2004 having a size of N/2×N/2 or the third coding unit 2024 having a size of N/2×N/22 by partitioning the second coding unit 2012 in a horizontal direction, or determine the third coding unit 2014 having a size of N/22×N/2 by partitioning the second coding unit 2012 in vertical and horizontal directions.

According to an embodiment, the image decoding apparatus 100 may determine the third coding unit 2004, 2014, or 2024 by dividing at least one of a width and height of the second coding unit 2022 having a size of N×N/2. That is, the image decoding apparatus 100 may determine the third coding unit 2004 having a size of N/2×N/2 or the third coding unit 2014 having a size of N/22×N/2 by partitioning the second coding unit 2022 in a vertical direction, or determine the third coding unit 2024 having a size of N/2×N/22 by partitioning the second coding unit 2022 in vertical and horizontal directions.

According to an embodiment, the image decoding apparatus 100 may partition the square coding unit 2000, 2002, or 2004 in a horizontal or vertical direction. For example, the image decoding apparatus 100 may determine the first coding unit 2010 having a size of N×2N by partitioning the first coding unit 2000 having a size of 2N×2N in a vertical direction, or determine the first coding unit 2020 having a size of 2N×N by partitioning the first coding unit 2000 in a horizontal direction. According to an embodiment, when a depth is determined based on the length of the longest side of a coding unit, a depth of a coding unit determined by partitioning the first coding unit 2000, 2002 or 2004 having a size of 2N×2N in a horizontal or vertical direction may be the same as the depth of the first coding unit 2000, 2002 or 2004.

According to an embodiment, a width and height of the third coding unit 2014 or 2024 may be ½² times those of the first coding unit 2010 or 2020. When a depth of the first coding unit 2010 or 2020 is D, a depth of the second coding unit 2012 or 2014, the width and height of which are ½ times those of the first coding unit 2010 or 2020, may be D+1, and a depth of the third coding unit 2014 or 2024, the width and height of which are ½² times those of the first coding unit 2010 or 2020, may be D+2.

Figure 21:
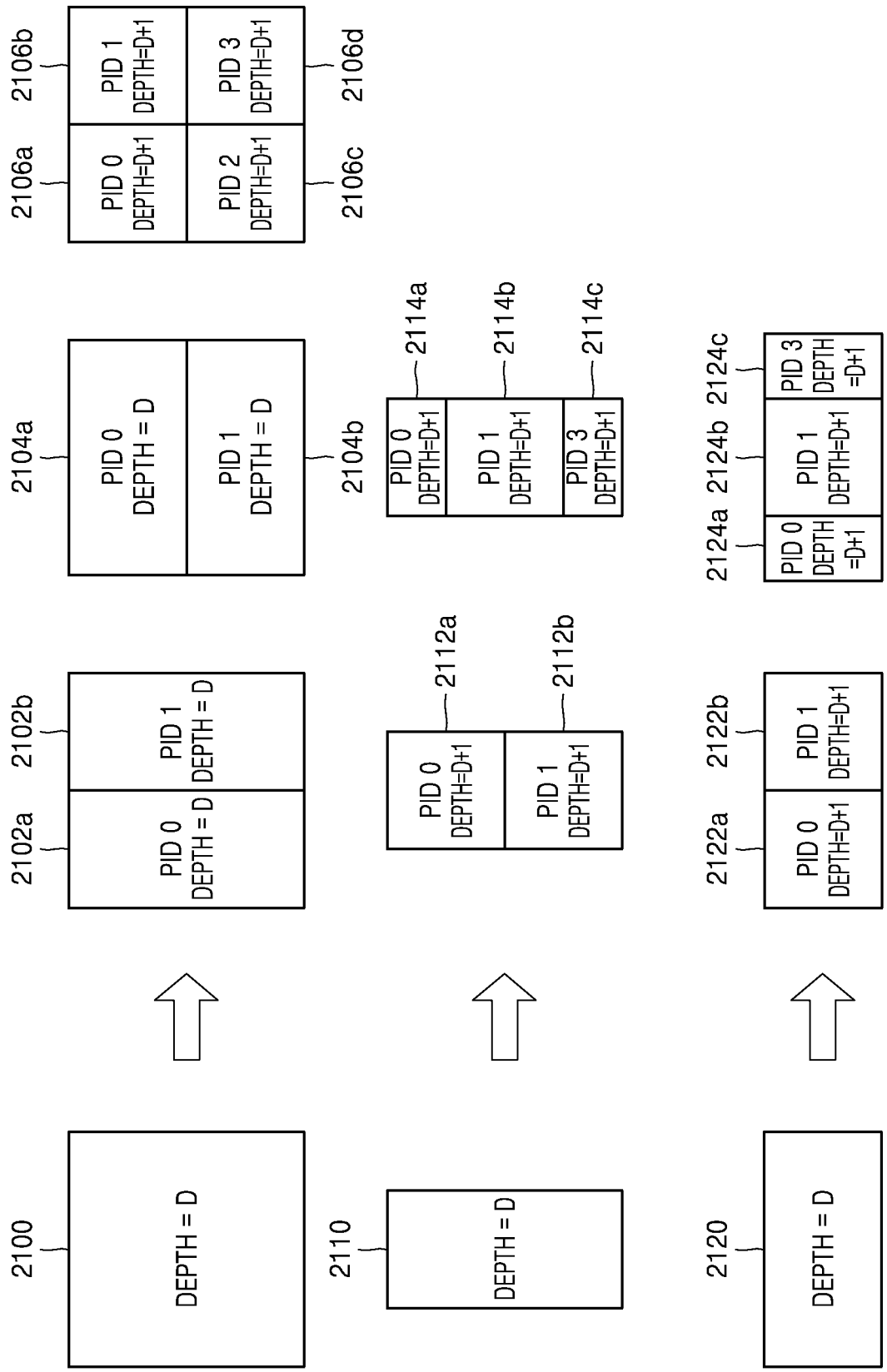
FIG. 21 illustrates depths of coding units and part indices (PIDs) for distinguishing the coding units, the depths and PIDs being determinable based on the shapes and sizes of the coding units, according to an embodiment.

FIG. 21 illustrates depths of coding units and part indices (PIDs) for distinguishing the coding units, the depths and PIDs being determinable based on the shapes and sizes of the coding units, according to an embodiment.

According to an embodiment, the image decoding apparatus 100 may determine various-shaped second coding units by partitioning a square first coding unit 2100. Referring to FIG. 21, the image decoding apparatus 100 may determine second coding units 2102a, 2102b, 2104a, 2104b, 2106a, 2106b, 2106c, and 2106d by partitioning the first coding unit 2100 in at least one of vertical and horizontal directions based on partition shape information. That is, the image decoding apparatus 100 may determine the second coding units 2102a, 2102b, 2104a, 2104b, 2106a, 2106b, 2106c, and 2106d based on the partition shape information of the first coding unit 2100.

According to an embodiment, depths of the second coding units 2102a, 2102b, 2104a, 2104b, 2106a, 2106b, 2106c, and 2106d, which are determined based on the partition shape information of the square first coding unit 2100, may be determined based on the length of a long side thereof. For example, since the length of a side of the square first coding unit 2100 equals the length of a long side of the non-square second coding units 2102a, 2102b, 2104a, and 2104b, the first coding unit 2100 and the non-square second coding units 2102a, 2102b, 2104a, and 2104b may have the same depth, e.g., D. However, when the image decoding apparatus 100 partitions the first coding unit 2100 into the four square second coding units 2106a, 2106b, 2106c, and 2106d based on the partition shape information, since the length of a side of the square second coding units 2106a, 2106b, 2106c, and 2106d is ½ times the length of a side of the first coding unit 2100, a depth of the second coding units 2106a, 2106b, 2106c, and 2106d may be D+1 which is deeper than the depth D of the first coding unit 2100 by 1.

According to an embodiment, the image decoding apparatus 100 may determine a plurality of second coding units 2112a, 2112b, 2114a, 2114b, and 2114c by partitioning a first coding unit 2110, a height of which is longer than a width, in a horizontal direction based on the partition shape information. According to an embodiment, the image decoding apparatus 100 may determine a plurality of second coding units 2122a, 2122b, 2124a, 2124b, and 2124c by partitioning a first coding unit 2120, a width of which is longer than a height, in a vertical direction based on the partition shape information.

According to an embodiment, a depth of the second coding units, 2112a, 2112b, 2114a, 2114b, 2116a, 2116b, 2116c, and 2116d, which are determined based on the partition shape information of the non-square first coding unit 2110 or 2120, may be determined based on the length of a long side thereof. For example, since the length of a side of the square second coding units 2112a and 2112b is ½ times the length of a long side of the first coding unit 2110 having a non-square shape, a height of which is longer than a width, a depth of the square second coding units 2102a, 2102b, 2104a, and 2104b is D+1 which is deeper than the depth D of the non-square first coding unit 2110 by 1.

Furthermore, the image decoding apparatus 100 may partition the non-square first coding unit 2110 into an odd number of second coding units 2114a, 2114b, and 2114c based on the partition shape information. The odd number of second coding units 2114a, 2114b, and 2114c may include the non-square second coding units 2114a and 2114c and the square second coding unit 2114b. In this case, since the length of a long side of the non-square second coding units 2114a and 2114c and the length of a side of the square second coding unit 2114b are ½ times the length of a long side of the first coding unit 2110, a depth of the second coding units 2114a, 2114b, and 2114c may be D+1 which is deeper than the depth D of the non-square first coding unit 2110 by 1. The image decoding apparatus 100 may determine depths of coding units partitioned from the first coding unit 2120 having a non-square shape, a width of which is longer than a height, by using the above-described method of determining depths of coding units partitioned from the first coding unit 2110.

According to an embodiment, the image decoding apparatus 100 may determine PIDs for identifying partitioned coding units, based on a size ratio between the coding units when an odd number of partitioned coding units do not have equal sizes. Referring to FIG. 21, a coding unit 2114b of a center location among an odd number of partitioned coding units 2114a, 2114b, and 2114c may have a width equal to that of the other coding units 2114a and 2114c and a height which is two times that of the other coding units 2114a and 2114c. That is, in this case, the coding unit 2114b at the center location may include two of the other coding unit 2114a or 2114c. Therefore, assuming that a PID of the coding unit 2114b at the center location is 1 based on a scan order, a PID of the coding unit 2114c located next to the coding unit 2114b may be increased by 2 and thus may be 3. That is, discontinuity in PID values may be present. According to an embodiment, the image decoding apparatus 100 may determine whether an odd number of partitioned coding units do not have equal sizes, based on whether discontinuity is present in PIDs for identifying the partitioned coding units.

According to an embodiment, the image decoding apparatus 100 may determine whether to use a specific partitioning method, based on PID values for identifying a plurality of coding units determined by partitioning a current coding unit. Referring to FIG. 21, the image decoding apparatus 100 may determine an even number of coding units 2112a and 2112b or an odd number of coding units 2114a, 2114b, and 2114c by partitioning the first coding unit 2110 having a rectangular shape, a height of which is longer than a width. The image decoding apparatus 100 may use PIDs to identify a plurality of coding units. According to an embodiment, the PID may be obtained from a sample of a predetermined location of each coding unit (e.g., a top left sample).

According to an embodiment, the image decoding apparatus 100 may determine a coding unit at a predetermined location from among the partitioned coding units, by using the PIDs for distinguishing the coding units. According to an embodiment, when the partition shape information of the first coding unit 2110 having a rectangular shape, a height of which is longer than a width, indicates to partition a coding unit into three coding units, the image decoding apparatus 100 may partition the first coding unit 2110 into three coding units 2114a, 2114b, and 2114c. The image decoding apparatus 100 may assign a PID to each of the three coding units 2114a, 2114b, and 2114c. The image decoding apparatus 100 may compare PIDs of an odd number of partitioned coding units to determine a coding unit at a center location from among the coding units. The image decoding apparatus 100 may determine the coding unit 2114b having a PID corresponding to a middle value among the PIDs of the coding units, as the coding unit at the center location from among the coding units determined by partitioning the first coding unit 2110. According to an embodiment, the image decoding apparatus 100 may determine PIDs for distinguishing partitioned coding units, based on a size ratio between the coding units when the partitioned coding units do not have equal sizes. Referring to FIG. 21, the coding unit 2114b generated by partitioning the first coding unit 2110 may have a width equal to that of the other coding units 2114a and 2114c and a height which is two times that of the other coding units 2114a and 2114c. In this case, assuming that the PID of the coding unit 2114b at the center location is 1, the PID of the coding unit 2114c located next to the coding unit 2114b may be increased by 2 and thus may be 3. When the PID is not uniformly increased as described above, the image decoding apparatus 100 may determine that a coding unit is partitioned into a plurality of coding units including a coding unit having a size different from that of the other coding units. According to an embodiment, when the partition shape information indicates to partition a coding unit into an odd number of coding units, the image decoding apparatus 100 may partition a current coding unit in such a manner that a coding unit of a predetermined location among an odd number of coding units (e.g., a coding unit of a centre location) has a size different from that of the other coding units. In this case, the image decoding apparatus 100, may determine the coding unit of the centre location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively partitioned.

Figure 22:
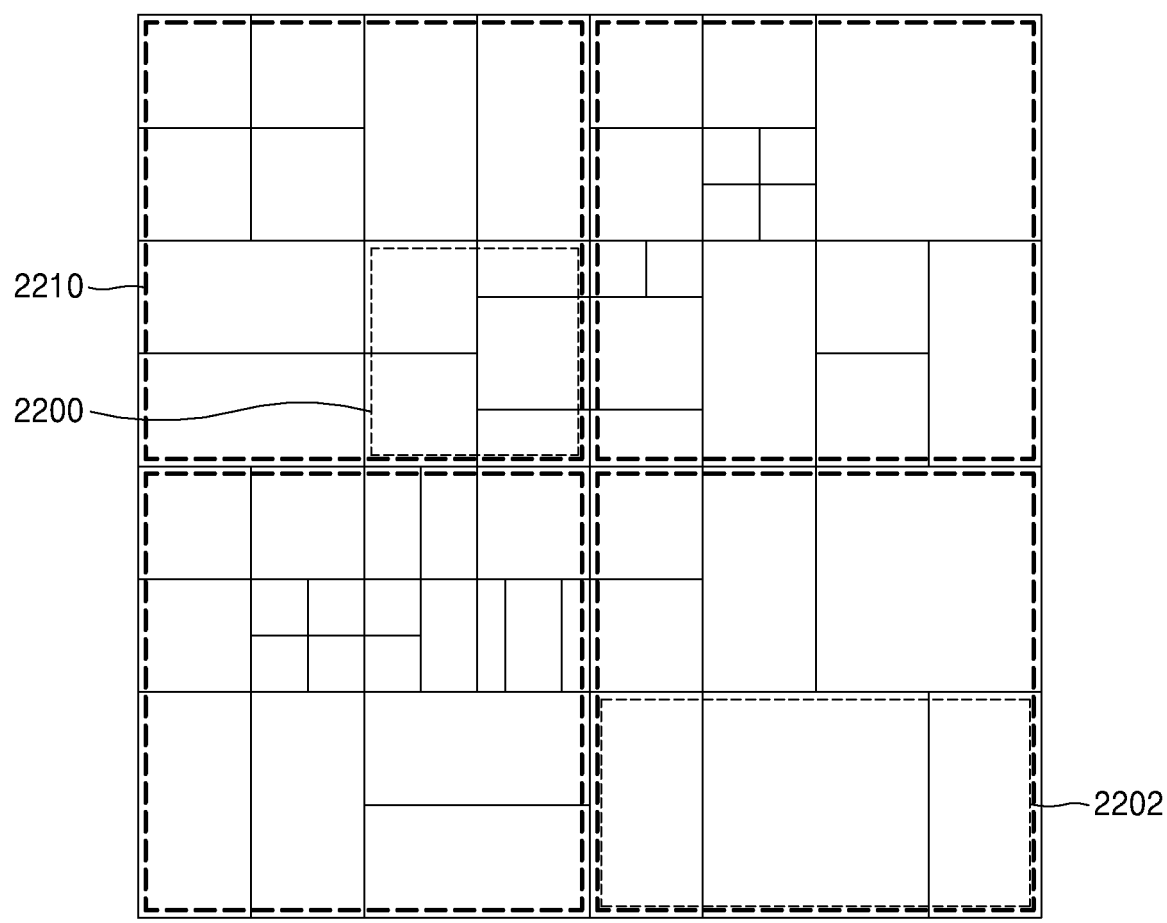
FIG. 22 illustrates that a plurality of coding units are determined based on a plurality of predetermined data units included in a picture, according to an embodiment.

FIG. 22 illustrates that a plurality of coding units are determined based on a plurality of predetermined data units included in a picture, according to an embodiment.

According to an embodiment, a predetermined data unit may be defined as a data unit where a coding unit starts to be recursively partitioned by using at least one of block shape information and partition shape information. That is, the predetermined data unit may correspond to a coding unit of an uppermost depth, which is used to determine a plurality of coding units partitioned from a current picture. In the following description, for convenience of explanation, the predetermined data unit is referred to as a reference data unit.

According to an embodiment, the reference data unit may have a predetermined size and shape. According to an embodiment, a reference coding unit may include M×N samples. Herein, M and N may be equal values, and may be integers expressed as multipliers of 2. That is, the reference data unit may have a square or non-square shape, and may be an integer number of coding units.

According to an embodiment, the image decoding apparatus 100 may partition the current picture into a plurality of reference data units. According to an embodiment, the image decoding apparatus 100 may partition the plurality of reference data units, which are partitioned from the current picture, by using partitioning information of each reference data unit. The operation of partitioning the reference data unit may correspond to a partitioning operation using a quadtree structure.

According to an embodiment, the image decoding apparatus 100 may previously determine the minimum size allowed for the reference data units included in the current picture. As such, the image decoding apparatus 100 may determine various reference data units having sizes equal to or greater than the minimum size, and determine one or more coding units by using the block shape information and the partition shape information with reference to the determined reference data unit.

Referring to FIG. 22, the image decoding apparatus 100 may use a square reference coding unit 2200 or a non-square reference coding unit 2202. According to an embodiment, the shape and size of reference coding units may be determined based on various data units capable of including one or more reference coding units (e.g., sequences, pictures, slices, slice segments, and largest coding units).

According to an embodiment, the bitstream obtainer 110 of the image decoding apparatus 100 may obtain, from a bitstream, at least one of reference coding unit shape information and reference coding unit size information with respect to each of the various data units. An operation of partitioning the square reference coding unit 2200 into one or more coding units has been described above in relation to the operation of partitioning the current coding unit 1000 of FIG. 10, and an operation of partitioning the non-square reference coding unit 2202 into one or more coding units has been described above in relation to the operation of partitioning the current coding unit 1100 or 1150 of FIG. 11. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the bitstream obtainer 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, and largest coding units). The image decoding apparatus 100 may determine the size and shape of reference data units with respect to each data unit, which satisfies the predetermined condition, by using the PID. When the reference coding unit shape information and the reference coding unit size information are obtained and used from the bitstream with respect to each data unit having a relatively small size, since efficiency of using the bitstream may not be good, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit partitioned from a picture may include one or more reference coding units, and coding units may be determined by recursively partitioning each reference coding unit. According to an embodiment, at least one of a width and height of the largest coding unit may be integer times at least one of the width and height of the reference coding units. According to an embodiment, the size of reference coding units may be obtained by partitioning the largest coding unit n times based on a quadtree structure. That is, the image decoding apparatus 100 may determine the reference coding units by partitioning the largest coding unit n times based on a quadtree structure, and partition the reference coding unit based on at least one of the block shape information and the partition shape information according to various embodiments.

Figure 23:
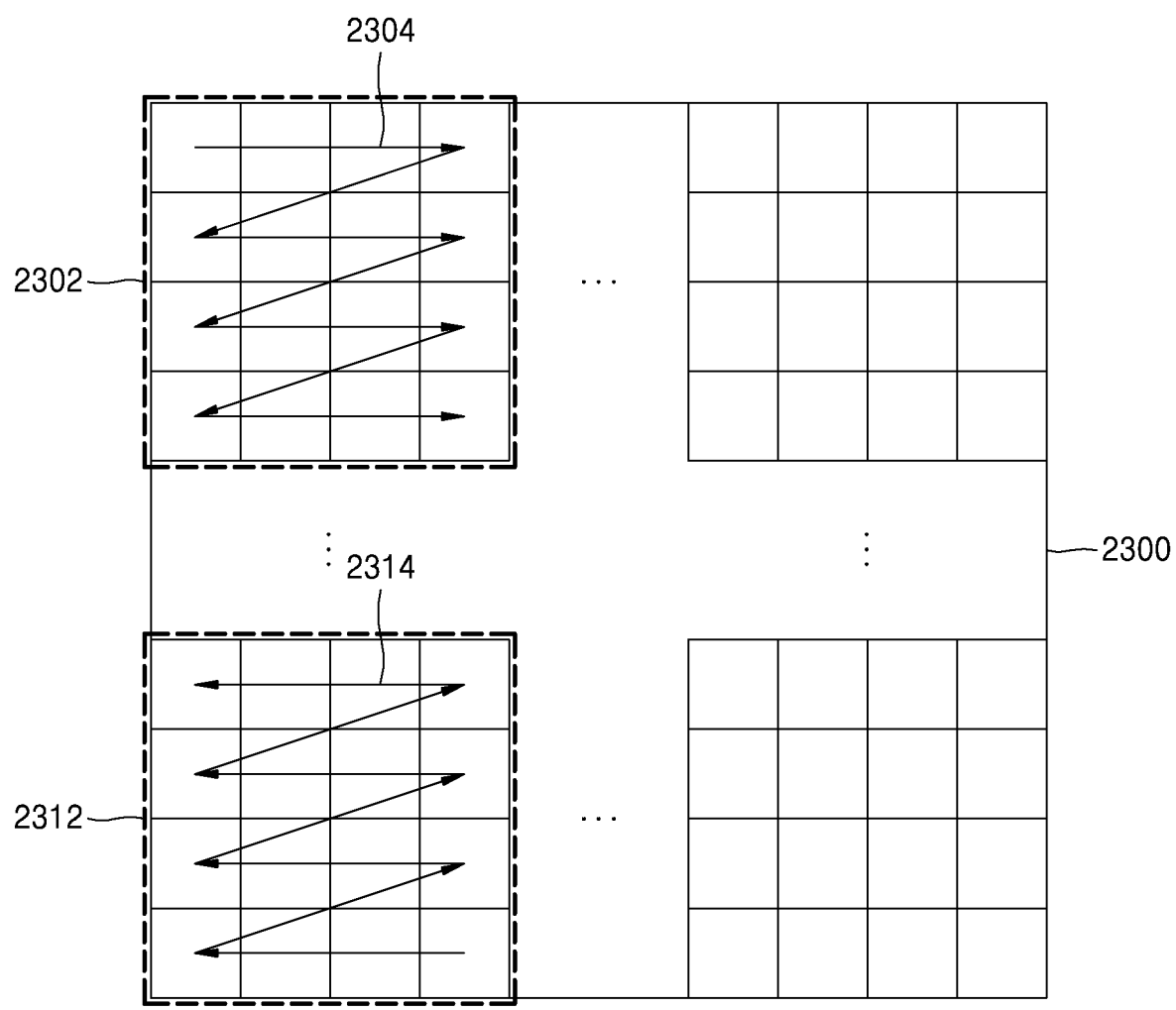
FIG. 23 illustrates a processing block serving as a unit for determining a determination order of reference coding units included in a picture, according to an embodiment.

FIG. 23 illustrates a processing block serving as a unit for determining a determination order of reference coding units included in a picture 2300, according to an embodiment.

According to an embodiment, the image decoding apparatus 100 may determine one or more processing blocks partitioned from a picture. The processing block is a data unit including one or more reference coding units partitioned from a picture, and the one or more reference coding units included in the processing block may be determined in a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and determine the size of one or more processing blocks included in the picture. The image decoding apparatus 100 may obtain the processing block size information from a bitstream and determine the size of one or more processing blocks included in the picture. The size of processing blocks may be a predetermined size of data units, which is indicated by the processing block size information.

According to an embodiment, the bitstream obtainer 110 of the image decoding apparatus 100 may obtain the processing block size information from the bitstream with respect to each specific data unit. For example, the processing block size information may be obtained from the bitstream in a data unit such as image, sequence, picture, slice, or slice segment. That is, the bitstream obtainer 110 may obtain the processing block size information from the bitstream with respect to each of the various data units, and the image decoding apparatus 100 may determine the size of one or more processing blocks, which are partitioned from the picture, by using the obtained processing block size information. The size of processing blocks may be integer times that of the reference coding units.

According to an embodiment, the image decoding apparatus 100 may determine the size of processing blocks 2302 and 2312 included in the picture 2300. For example, the image decoding apparatus 100 may determine the size of processing blocks based on the processing block size information obtained from the bitstream. Referring to FIG. 23, according to an embodiment, the image decoding apparatus 100 may determine a width of the processing blocks 2302 and 2312 to be four times the width of the reference coding units, and determine a height of the processing blocks 2302 and 2312 to be four times the height of the reference coding units. The image decoding apparatus 100 may determine a determination order of one or more reference coding units in one or more processing blocks.

According to an embodiment, the image decoding apparatus 100 may determine the processing blocks 2302 and 2312, which are included in the picture 2300, based on the size of processing blocks, and determine a determination order of one or more reference coding units in the processing blocks 2302 and 2312. According to an embodiment, determination of reference coding units may include determination of the size of reference coding units.

According to an embodiment, the image decoding apparatus 100 may obtain, from the bitstream, determination order information of one or more reference coding units included in one or more processing blocks, and determine a determination order to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain the determination order information of reference coding units from the bitstream with respect to each specific data unit. For example, the bitstream obtainer 110 may obtain the determination order information of reference coding units from the bitstream with respect to each data unit such as image, sequence, picture, slice, slice segment, or processing block. Since the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the bitstream obtainer 110 may obtain the determination order information of reference coding units from the bitstream as information related to the processing blocks 2302 and 2312, and the image decoding apparatus 100 may determine a determination order of one or more reference coding units included in the processing blocks 2302 and 2312 and determine one or more reference coding units, which are included in the picture 2300, based on the determination order. Referring to FIG. 23, the image decoding apparatus 100 may determine determination orders 2304 and 2314 of one or more reference coding units in the processing blocks 2302 and 2312, respectively. For example, when the determination order information of reference coding units is obtained with respect to each processing block, different types of the determination order information of reference coding units may be obtained for the processing blocks 2302 and 2312. When the determination order 2304 of reference coding units in the processing block 2302 is a raster scan order, reference coding units included the processing block 2302 may be determined in a raster scan order. Unlike this, when the determination order 2314 of reference coding units in the other processing block 2312 is an inverse raster scan order, reference coding units included in the processing block 2312 may be determined in an inverse raster scan order.

According to an embodiment, the image decoding apparatus 100 may decode the determined one or more reference coding units. The image decoding apparatus 100 may decode the picture based on the reference coding units determined as described above. A method of decoding the reference coding units may include various image decoding methods.

According to an embodiment, the image decoding apparatus 100 may obtain block shape information indicating the shape of a current coding unit or partition shape information indicating a partitioning method of the current coding unit, from the bitstream, and use the obtained information. The block shape information or the partition shape information may be included in the bitstream related to various data units. For example, the image decoding apparatus 100 may use the block shape information or the partition shape information included in a sequence parameter set, a picture parameter set, a video parameter set, a slice header, or a slice segment header. Furthermore, the image decoding apparatus 100 may obtain syntax corresponding to the block shape information or the partition shape information from the bitstream with respect to each largest coding unit, reference coding unit, or processing block, and use the obtained syntax.

While the present disclosure has been particularly shown and described with reference to embodiments thereof, it will be understood by one of ordinary skill in the art that various changes in form and details may be made therein without departing from the scope of the disclosure as defined by the following claims. The embodiments should be considered in a descriptive sense only and not for purposes of limitation. Therefore, the scope of the disclosure is defined not by the detailed description of the disclosure but by the following claims, and all differences within the scope will be construed as being included in the present disclosure.

Meanwhile, the afore-described embodiments of the present disclosure can be written as computer programs and can be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

The invention claimed is:

1. An image decoding method comprising:
   partitioning an image into one or more blocks;
   obtaining a motion vector of a current block partitioned from the image;
   obtaining a prediction block of the current block by performing inter prediction on the current block, based on the motion vector;
   determining a type of a filter, based on whether an inter prediction mode of the current block is an Advanced Motion Vector Prediction (AMVP) mode or an merge mode;
   determining information of the filter, based on at least one of a size and a direction of the motion vector;
   filtering the prediction block by using the information of the filter;
   obtaining a residual block of the current block from a bitstream; and
   reconstructing the current block by using the filtered prediction block and the residual block, wherein the determining of the type of the filter further comprises:
   when the inter prediction mode of the current block is the AMVP mode and a reference direction indicating at least one reference picture list used in the inter prediction is unidirectional, determining the type of the filter as a first filter type or a second filter type,
   when the inter prediction mode of the current block is the AMVP mode and the reference direction is bidirectional, determining the type of the filter as the first filter type, and
   when the inter prediction mode of the current block is the merge mode, determining the type of the filter as a first filter type, without consideration of a reference direction indicating at least one reference picture list used in the inter prediction.

2. The image decoding method of claim 1, wherein the determining of the information of the filter comprises determining a size of the filter, based on the size of the motion vector.

3. The image decoding method of claim 1, wherein the determining of the information of the filter comprises:
   determining a current sample in the prediction block; and
   determining a neighboring sample of the current sample, based on the direction of the motion vector, and
   wherein the filtering comprises obtaining a filtered prediction value of the current sample by using a prediction value of the neighboring sample.

4. The image decoding method of claim 3, wherein the determining of the information of the filter further comprises determining a first weight of the current sample and a second weight of the neighboring sample, based on the size and the direction of the motion vector, and
   wherein the filtered prediction value is obtained by using a prediction value of the current sample to which the first weight has been applied and the prediction value of the neighboring sample to which the second weight has been applied.

5. The image decoding method of claim 1, further comprising determining the type of the filter, based on a reference direction indicating at least one reference picture list used in the inter prediction.

6. The image decoding method of claim 1, further comprising:
   obtaining a first flag of the current block from the bitstream, the first flag indicating whether to perform filtering on the prediction block; and
   when the first flag indicates to perform filtering on the prediction block, obtaining a second flag of the current block from the bitstream, the second flag indicating the type of the filter.

7. The image decoding method of claim 6, wherein a context index used in performing arithmetic decoding on the first flag and the second flag is determined based on at least one of the size of the motion vector and a size of the current block.

8. An image decoding apparatus comprising: a bitstream obtainer configured to obtain a residual block of a current block from a bitstream; and a decoder configured to: partition an image into one or more blocks; obtain a motion vector of the current block partitioned from the image; obtain a prediction block of the current block by performing inter prediction on the current block, based on the motion vector; determine a type of a filter, based on whether an inter prediction mode of the current block is an Advanced Motion Vector Prediction (AMVP) mode or an merge mode; determine information of the filter, based on at least one of a size and a direction of the motion vector; filter the prediction block by using the information of the filter; and reconstruct the current block by using the filtered prediction block and the residual block, wherein: when the inter prediction mode of the current block is the AMVP mode and a reference direction indicating at least one reference picture list used in the inter prediction is unidirectional, the decoder is further configured to determine the type of the filter by determining the type of the filter as a first filter type or a second filter type, when the inter prediction mode of the current block is the AMVP mode and the reference direction is bidirectional, the decoder is further configured to determine the type of the filter by determining the type of the filter as the first filter type, and when the inter prediction mode of the current block is the merge mode, the decoder is further configured to determine the type of the filter by determining the type of the filter as a first filter type, without consideration of a reference direction indicating at least one reference picture list used in the inter prediction.

9. The image decoding method of claim 1, wherein, when the inter prediction mode of the current block is the merge mode, the filter that has been applied to the prediction block is determined as a filter for a merge candidate.

10. An image decoding apparatus comprising:
   a bitstream obtainer configured to obtain a residual block of a current block from a bitstream; and
   a decoder configured to:
      partition an image into one or more blocks;
      obtain a motion vector of the current block partitioned from the image;
      obtain a prediction block of the current block by performing inter prediction on the current block, based on the motion vector;
      determine a type of a filter, based on whether an inter prediction mode of the current block is an Advanced Motion Vector Prediction (AMVP) mode or an merge mode;
      determine information of the filter, based on at least one of a size and a direction of the motion vector;
      filter the prediction block by using the information of the filter; and
      reconstruct the current block by using the filtered prediction block and the residual block; wherein:
   when the inter prediction mode of the current block is the AMVP mode and a reference direction indicating at least one reference picture list used in the inter prediction is unidirectional, the decoder is further configured to determine the type of the filter by determining the type of the filter as a first filter type or a second filter type,
   when the inter prediction mode of the current block is the AMVP mode and the reference direction is bidirectional, the decoder is further configured to determine the type of the filter by determining the type of the filter as the first filter type, and
   when the inter prediction mode of the current block is the merge mode, the decoder is further configured to determine the type of the filter by determining the type of the filter as a first filter type, without consideration of a reference direction indicating at least one reference picture list used in the inter prediction.

11. An image encoding method comprising:
   partitioning an image into one or more blocks;
   obtaining a motion vector of a current block partitioned from the image; obtaining a prediction block of the current block by performing inter prediction on the current block, based on the motion vector;
   determining a type of a filter, based on whether an inter prediction mode of the current block is an Advanced Motion Vector Prediction (AMVP) mode or an merge mode;
   determining information of the filter, based on at least one of a size and a direction of the motion vector;
   filtering the prediction block by using the information of the filter;
   encoding a residual block between the filtered prediction block and original data of the current block; and
   generating a bitstream comprising the encoded residual block, wherein the determining of the type of the filter further comprises:
      when the inter prediction mode of the current block is the AMVP mode and a reference direction indicating at least one reference picture list used in the inter prediction is unidirectional, determining the type of the filter as a first filter type or a second filter type,
      when the inter prediction mode of the current block is the AMVP mode and the reference direction is bidirectional, determining the type of the filter as the first filter type, and
      when the inter prediction mode of the current block is the merge mode, determining the type of the filter as a first filter type, without consideration of a reference direction indicating at least one reference picture list used in the inter prediction.

* * * * *